US008218029B2

(12) United States Patent
Nagai

(10) Patent No.: US 8,218,029 B2
(45) Date of Patent: Jul. 10, 2012

(54) IMAGE TAKING APPARATUS, CORRECTION CIRCUIT AND CORRECTION METHOD

(75) Inventor: Takahiro Nagai, Kanagawa (JP)

(73) Assignee: Sony Corporation, Tokyo (JP)

(*) Notice: Subject to any disclaimer, the term of this patent is extended or adjusted under 35 U.S.C. 154(b) by 504 days.

(21) Appl. No.: 12/546,729

(22) Filed: Aug. 25, 2009

(65) Prior Publication Data
US 2010/0053369 A1 Mar. 4, 2010

(30) Foreign Application Priority Data

Aug. 26, 2008 (JP) ................. P2008-217256

(51) Int. Cl.
*H04N 5/235* (2006.01)
(52) U.S. Cl. ............. 348/229.1; 348/227.1; 348/228.1; 348/226.1; 348/447; 348/E5.11; 348/910
(58) Field of Classification Search ........... 348/229.1, 348/227.1, 228.1
See application file for complete search history.

(56) References Cited

U.S. PATENT DOCUMENTS

| | | | |
|---|---|---|---|
| 6,710,818 B1 * | 3/2004 | Kasahara et al. ............. 348/607 |
| 7,142,234 B2 * | 11/2006 | Kaplinsky et al. .......... 348/226.1 |
| 2002/0018119 A1 | 2/2002 | Kogure et al. | |
| 2004/0012692 A1 * | 1/2004 | Arazaki ....................... 348/226.1 |
| 2006/0279641 A1 * | 12/2006 | Takahashi et al. .......... 348/226.1 |
| 2007/0153094 A1 * | 7/2007 | Noyes et al. ................. 348/226.1 |
| 2008/0309791 A1 * | 12/2008 | Nishiwaki et al. .......... 348/226.1 |
| 2008/0316333 A1 * | 12/2008 | Furuya et al. ............... 348/229.1 |
| 2009/0066805 A1 * | 3/2009 | Fujiwara et al. ............ 348/223.1 |
| 2009/0147103 A1 * | 6/2009 | Chao ........................... 348/226.1 |
| 2010/0013953 A1 * | 1/2010 | Niikura ........................ 348/226.1 |

FOREIGN PATENT DOCUMENTS

| | | |
|---|---|---|
| JP | 11-164192 | 6/1999 |
| JP | 2001016508 A * | 1/2001 |
| JP | 2002-22439 | 1/2002 |
| JP | 2004-45919 | 2/2004 |
| JP | 2006-135838 | 5/2006 |
| JP | 2007 251611 | 9/2007 |
| WO | WO 2007/145168 | 12/2007 |

* cited by examiner

Primary Examiner — Jason Chan
Assistant Examiner — Cynthia Segura
(74) Attorney, Agent, or Firm — Frommer Lawrence & Haug LLP; William S. Frommer

(57) ABSTRACT

Disclosed herein is an image taking apparatus including an image taking device, a gain adjustment circuit, and a correction circuit. The image taking device operates with timings based on a frame rate determined in advance and the total number of horizontal lines, has an electronic shutter allowing a shutter speed to be adjusted, receives light in a period equal to the shutter speed of the electronic shutter and carries out an opto-electrical conversion process on the light for every horizontal line in order to generate a predetermined signal. The gain adjustment circuit adjusts the gain of the electrical signal received from the image taking device. The correction circuit compares an image taking video signal with a reference video signal to compute a flicker component as a component oriented in the vertical direction of an image represented by the image taking video signal in a flicker correction process of eliminating flickers.

12 Claims, 14 Drawing Sheets

IMAGE TAKING APPARATUS, CORRECTION CIRCUIT AND CORRECTION METHOD

BACKGROUND OF THE INVENTION

1. Field of the Invention

The present invention relates to an image taking apparatus capable of preventing flickers from being generated in a video signal, a correction circuit and a correction method.

2. Description of the Related Art

In the past, the image-quality performance of a CMOS (Complementary Metal Oxide Semiconductor) device was not more excellent than the image-quality performance of a CCD (Charge Coupled Device Image Sensor) device. In recent years, however, the image-quality producing performance of a CMOS device is comparable with the image-quality producing performance of a CCD. For this reason, the CMOS device is used mainly in the video field recently.

If an image taking device such as a CMOS device with an exposure timing varying from horizontal line to horizontal line is used by applying conditions determined in advance, a strip pattern with standstill contrast is generated in the horizontal direction of the taken image. The strip pattern with such contrast is attributed to the blinking period of the light source and is referred to as a standstill flicker. In the following description, the standstill flicker is referred to merely as a flicker. It is to be noted that a contrast stripe pattern generated in the horizontal direction is referred to as a moving flicker. Conditions for generation of a flicker are listed as conditions (1) to (3) which are described as follows:

(1): An image is taken by making use of a blinking light source such as a fluorescent lamp.

(2): The blinking period of the light source is equal to the integral multiple of image taking frames taken per second.

(3): An electronic shutter is used in the image taking operation.

If an image is taken in a state where conditions (1) to (3) are all satisfied, a flicker is generated. If only condition (2) is satisfied, no flicker is generated.

By referring to diagrams of FIGS. 1 to 3, causes of the generation of a flicker are explained. In this case, the light source cited in condition (1) is a fluorescent lamp driven at a power-supply frequency of 60 Hz (In the following description, the fluorescent lamp driven at a power-supply frequency of 60 Hz is also referred to simply as a 60-Hz fluorescent lamp). The number of horizontal lines of the CMOS device is 1125.

FIGS. 1A and 1B are a plurality of diagrams showing exposure timings of horizontal lines of the CMOS device used in an image taking operation which makes use of a 60-Hz fluorescent lamp. To be more specific, FIG. 1A is a diagram showing a graph representing changes of the brightness of the 60-Hz fluorescent lamp along the time axis. The horizontal axis of the diagram is the time axis. As is obvious from a waveform 102, the blinking period of the fluorescent lamp is a period which is a frequency of 120 Hz.

On the other hand, FIG. 1B is a diagram showing exposure start times. In order to satisfy condition (2) described above, the frame rate of a video taken by making use of an image taking device is 60 frames/second. That is to say, the time (exposure time) that it takes to take an image of a frame is $1/60$ seconds. In addition, the shutter speed of an electronic shutter set in the CMOS device as the electronic shutter mentioned in condition (3) is equivalent to a time period of $1/2000$ seconds.

If an image is taken by applying the three conditions described above, a video actually used is a video taken only during an effective exposure time 103 of $1/2000$ seconds in the exposure time of $1/60$ seconds for each horizontal line. That is to say, a video taken during an ineffective exposure time 104 is not used. It is to be noted that there are horizontal lines 1 to 1125 of the CMOs device and, as described above, the exposure time of $1/60$ seconds for each horizontal line is the time that it takes to take an image of a frame.

In addition, the exposure processes of the horizontal lines of the CMOS device are carried out sequentially in an order starting from horizontal line 1 to horizontal line 1125. The sequential execution of the exposure processes corresponds to the procedure for taking an image of a frame. Then, as the operation to take an image of a frame is ended, horizontal line 1 is subjected to the exposure process. In order to take an image of a frame (or 1125 horizontal lines) in the exposure time of $1/60$ seconds, the timing shift between the starts of the exposure processes for adjacent horizontal lines is thus $(1/60)/1125$ seconds.

As described above, if an operation to take an image is carried out by making use of a 60-Hz fluorescent lamp with the shutter speed of the electronic shutter set at $1/2000$ seconds, the amount of light entering the horizontal lines of the image taken device can be computed by integrating the waveform 102 over the effective exposure times 103 of the horizontal lines. Changes of the amount of light from horizontal line to horizontal line are represented by a waveform 202 shown in the diagram of FIG. 2. The period of the waveform 202 is a frequency of 120 Hz and is thus equal to the blinking period of the fluorescent lamp.

In actuality, if an operation to take an image of a photographing subject is carried out by making use of a 60-Hz fluorescent lamp with the shutter speed of the electronic shutter set at $1/2000$ seconds, light entering the horizontal lines of the CMOS device is light reflected by the subject of photographing. Thus, an image 303 shown in a diagram of FIG. 3 as the image of a frame determined in advance includes a strip pattern which exhibits standstill contrast and has a period equal to a frequency of 120 Hz. That is to say, the luminance changes of the horizontal lines of the image 303 are variations attributed to the subject of photographing as variations superposed on periodical variations caused by a flicker as shown by the waveform 302. In the case of such a standstill flicker, luminance changes due to the blinking state of the fluorescent lamp are hardly generated between pixels composing the present frame and the same pixels composing the frame immediately leading ahead of the present frame.

By the way, a representative technology for correcting a flicker is disclosed in documents such as Japanese Patent Laid-Open No. Hei 11-164192 (for example, referred to as Patent Document 1). In accordance with this technology, a flicker is controlled by adjusting the gain of every control signal by making use of a correction value which is computed as a value for controlling the gain of every control signal and the luminance. The gain of every color signal and the luminance are controlled by making use of waveforms of conversions of the luminance and the color phase which are observed on the screen. The luminance and the color phase are generated by a beat tone determined by a blinking frequency of an electrical discharging phenomenon or the like and a frame frequency or a field frequency.

SUMMARY OF THE INVENTION

The technology disclosed in Patent Document 1 has a problem that, even though the technology is capable of controlling a moving flicker, the technology is not capable of carrying a correction process of eliminating a standstill flicker.

Addressing the problem described above, inventors of the present invention have innovated an image taking apparatus which is capable of eliminating standstill flickers from a video containing the flickers or capable of reducing the flickers.

In order to solve the problem described above, there is provided an image taking apparatus according to the present embodiments. The image taking apparatus according to the present embodiments employs an image taking device, a gain adjustment circuit and a correction circuit. The image taking device operates with timings based on a frame rate determined in advance and the total number of horizontal lines of the image taking device (or the total number of horizontal lines of an image created in the image taking device). The image taking device is provided with an electronic shutter which allows a shutter speed thereof to be adjusted. The image taking device receives light in a period determined by the shutter speed of the electronic shutter and carries out an opto-electrical conversion process on the light for every horizontal line in order to convert the light into an electrical signal, the type of which is determined in advance. The gain adjustment circuit is a circuit for adjusting the gain of the electrical signal received from the image taking device in order to generate an analog video signal which has a level determined in advance. The correction circuit compares an image taking video signal generated by the gain adjustment circuit with a reference video signal also generated by the gain adjustment circuit. The image taking video signal is a video signal which is generated by the gain adjustment circuit when the blinking period of the received light is equal to the integral multiple of a frame rate and a shutter speed determined in advance has been set for the electronic shutter. On the other hand, the reference video signal is a flicker-free video signal which is generated without a flicker by the gain adjustment circuit when the blinking period of the received light is equal to the integral multiple of a frame rate, and a reference shutter speed equal to the integral multiple of the blinking period of the received light has been set for the electronic shutter. The correction circuit compares the image taking video signal with the reference video signal in order to compute a flicker component which is contained in the image taking video signal as a component oriented in the vertical direction of an image represented by the image taking video signal. The correction circuit then eliminates flickers contained in the image taking video signal in accordance with the computed flicker component.

In accordance with the configuration described above, first of all, a reference video signal containing no flicker is generated in advance. Then, the reference video signal is compared with an image taking video signal containing a flicker. Subsequently, on the basis of a result of the comparison, a flicker component showing the characteristic of the flicker contained in the image taking video signal is found. From the flicker component, the characteristic of the flickers contained in the image taking video signal can be recognized and the flickers contained in the image taking video signal can thus be removed (or reduced).

In accordance with the present embodiments, the characteristic of flickers contained in a video signal can be recognized and the flickers contained in the video signal can thus be removed (or reduced) with ease.

DETAILED DESCRIPTION OF THE PREFERRED EMBODIMENTS

A preferred embodiment of the present invention is explained by referring to diagrams of FIGS. 4 to 14 as follows.

The preferred embodiment described below is merely a good typical example of the present invention. Even though a variety of technologically desirable restrictions are imposed on the preferred embodiment, the range of implementations of the present invention is by no means limited to the embodiment. That is to say, the present invention can be implemented by a variety of modified versions obtained by changing the preferred embodiment as long as no limitations are explained particularly in the following description as limitations imposed on the present invention. For example, a numerical value of a parameter is no more than a desirable typical example and, thus, the value of the parameter is by no means limited to the typical example and can therefore be changed to a value other than the example as long as no limitations are explained particularly in the following description as limitations imposed on the value of the parameter. In addition, diagrams of figures referred to in the following descriptions show approximate dimensions, shapes and positional relations.

Figure 4:
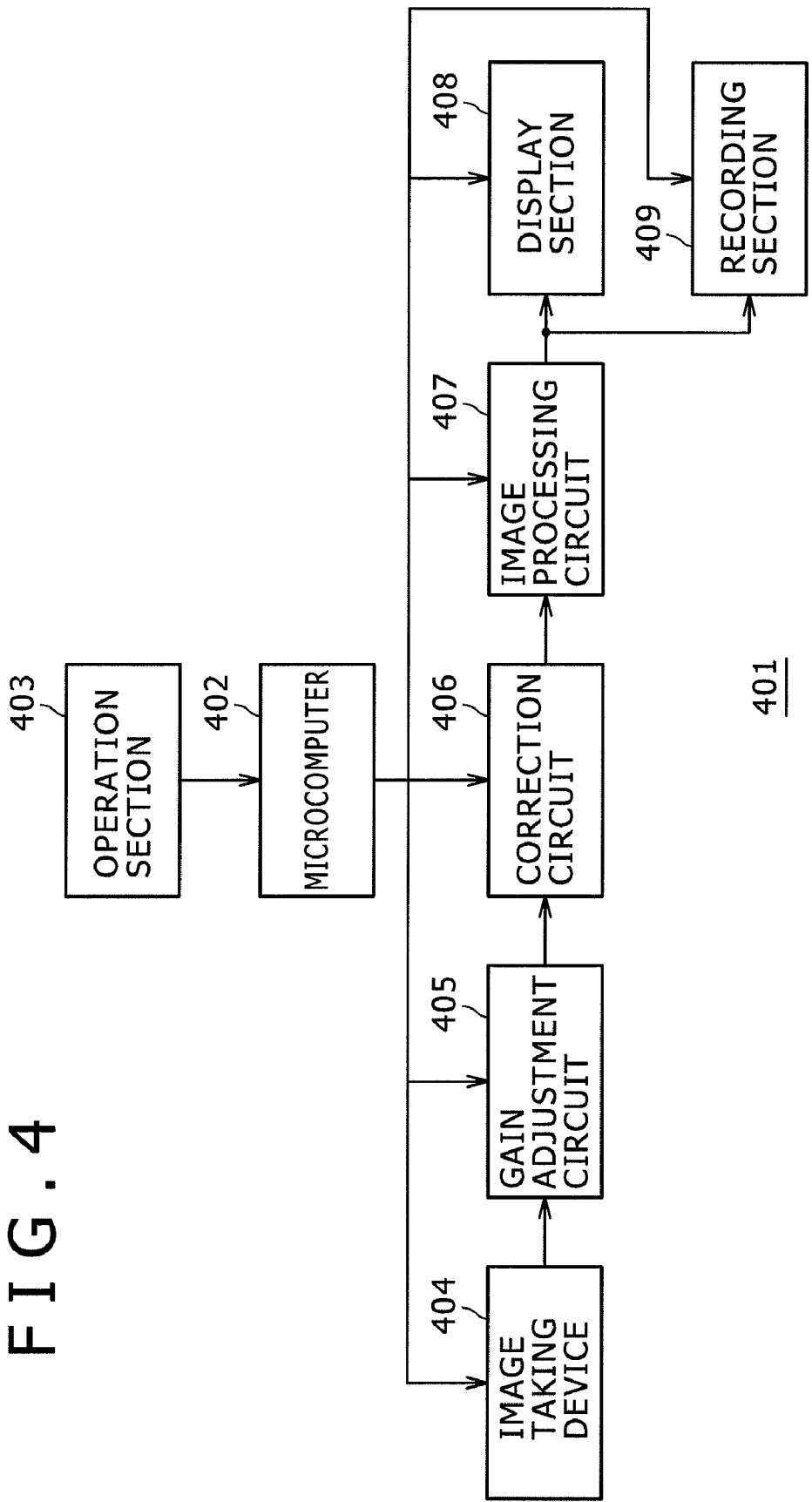
FIG. 4 is a functional block diagram showing an image taking apparatus according to an embodiment of the present invention.

FIG. 4 is a functional block diagram showing an image taking apparatus 401 according to the embodiment.

The image taking apparatus 401 has a lens which is not shown in the diagram. Image taking light passes through this lens and creates an image on an image creation surface of an image taking device 404. It is to be noted that the image creation surface itself is also not shown in the block diagram of FIG. 4. The image taking device 404 is a CMOS (Complementary Metal Oxide Silicon) device. The image taking light passing through the lens and creating the image on the image creation surface of a image taking device 404 is subjected to an opto-electrical conversion process for every horizontal line and with a timing determined in advance in order to convert the light into an analog video signal, the type of which is also determined in advance. The analog video signal generated by the image taking device 404 is then supplied to a gain adjustment circuit 405. In addition, the image taking device 404 is also provided with a function of an electronic shutter. On the basis of a command received from a microcomputer 402 to be described later, the image taking device 404 determines the speed of the electronic shutter. It is to be noted that, in this embodiment, the frame rate of a video, which is created by the image taking device 404, is 60 frames per second whereas the number of horizontal lines of the image taking device 404 is 1125.

The gain adjustment circuit 405 is a circuit for adjusting the gain of the analog video signal received from the image taking device 404 in order to generate an analog video signal which has a level determined in advance. The gain adjustment circuit 405 is also a circuit for carrying out an A/D conversion process on the generated analog video signal in order to generate a digital video signal determined in advance. The gain adjustment circuit 405 then supplies the digital video signal to a correction circuit 406. In this embodiment, the gain adjustment circuit 405 adjusts the gain of the analog video signal received from the image taking device 404. It is to be noted that, instead of adjusting the gain of the analog video signal received from the image taking device 404, the gain adjustment circuit 405 may also adjust the gain of the digital video signal generated as a result of the A/D conversion process.

A correction circuit 406 is a circuit for eliminating (or reducing) flickers contained in a video signal received from the gain adjustment circuit 405. The process carried out by the correction circuit 406 to eliminate (or reduce) flickers contained in a video signal received from the gain adjustment circuit 405 is referred to as a flicker correction process.

The correction circuit 406 supplies the video signal obtained as a result of the flicker correction process carried out by the correction circuit 406 to an image processing circuit 407. In addition to the flicker correction process, the correction circuit 406 may also carry out other signal processing such as a correcting process of image data for a variety of peripheral light quantity losses, an interpolation process determined in advance, a filtering process accompanying the interpolation process and a shading correction process. It is worth noting that the other signal processing is not the essence of the present invention and is therefore not explained in this invention specification. The correction circuit 406 may also carry out processing such as a process of improving the quality of an image. The correction circuit 406 carries out the flicker correction process and the other correction processing in accordance with control executed by the microcomputer 402. It is to be noted that details of the correction circuit 406 will be described later by referring to diagrams of FIGS. 5 to 14.

The image processing circuit 407 mentioned above is a circuit for carrying out the commonly known image processing such as a color-hue process, a luminance reduction process and a gamma correction process. A video signal obtained as a result of the image processing is displayed as a video on a display section 408 such as a liquid-crystal display section and stored in a recording section 409 which is typically a memory and the like.

The microcomputer 402 is a typical control section for controlling the respective circuits employed in the image taking apparatus 401. To put it more concretely, the microcomputer 402 controls processing such as an operation to set the shutter speed of the electronic shutter employed in the image taking device 404 and an operation to set the gain used in the gain adjustment circuit 405. On the basis of the shutter speed and the gain set, the microcomputer 402 also controls respective blocks included in the correction circuit 406 as shown in a block diagram of FIG. 5 to be referred later.

In addition, the microcomputer 402 also controls operations carried out by an optical system including a lens and the like not shown and operations carried out by sections employed in the image taking device 404 and the like. An operation section 403 has button keys and soft keys and the like. The button keys are provided on the image taking apparatus 401. Each of the soft keys is allocated to an icon displayed on the screen of the display section 408 mounted on the image taking apparatus 401. The operation section 403 supplies an operation signal representing an operation carried out by the user to the microcomputer 402 by way of an interface not shown in the block diagram of FIG. 4. The microcomputer 402 executes computer programs stored in an embedded nonvolatile storage section such as a ROM (Read Only Memory) in order to carry out processing determined in advance and control the respective circuits on the basis of the operation signal received from the operation section 403 by the user or on the basis of prescribed setting in advance or the like.

If the user enters a reference-value using command to the microcomputer 402 via the operation section 403, the microcomputer 402 sets a shutter speed in the image taking device 404 and a gain in the gain adjustment circuit 405. Each of the shutter speed and the gain has a value that prevents a flicker from appearing in the vertical direction of an image represented by a video signal generated by the gain adjustment circuit 405. In this embodiment, the shutter speed is referred to as a reference shutter speed whereas the gain is referred to as a reference gain. In addition, a reference video signal is defined as a video signal generated by the gain adjustment circuit 405 with the reference shutter speed set in the image taking device 404 and the reference gain set in the gain adjustment circuit 405. It is to be noted that a concrete method for generating the reference video signal will be explained later by referring to diagrams of FIGS. 9 and 10.

Figure 5:
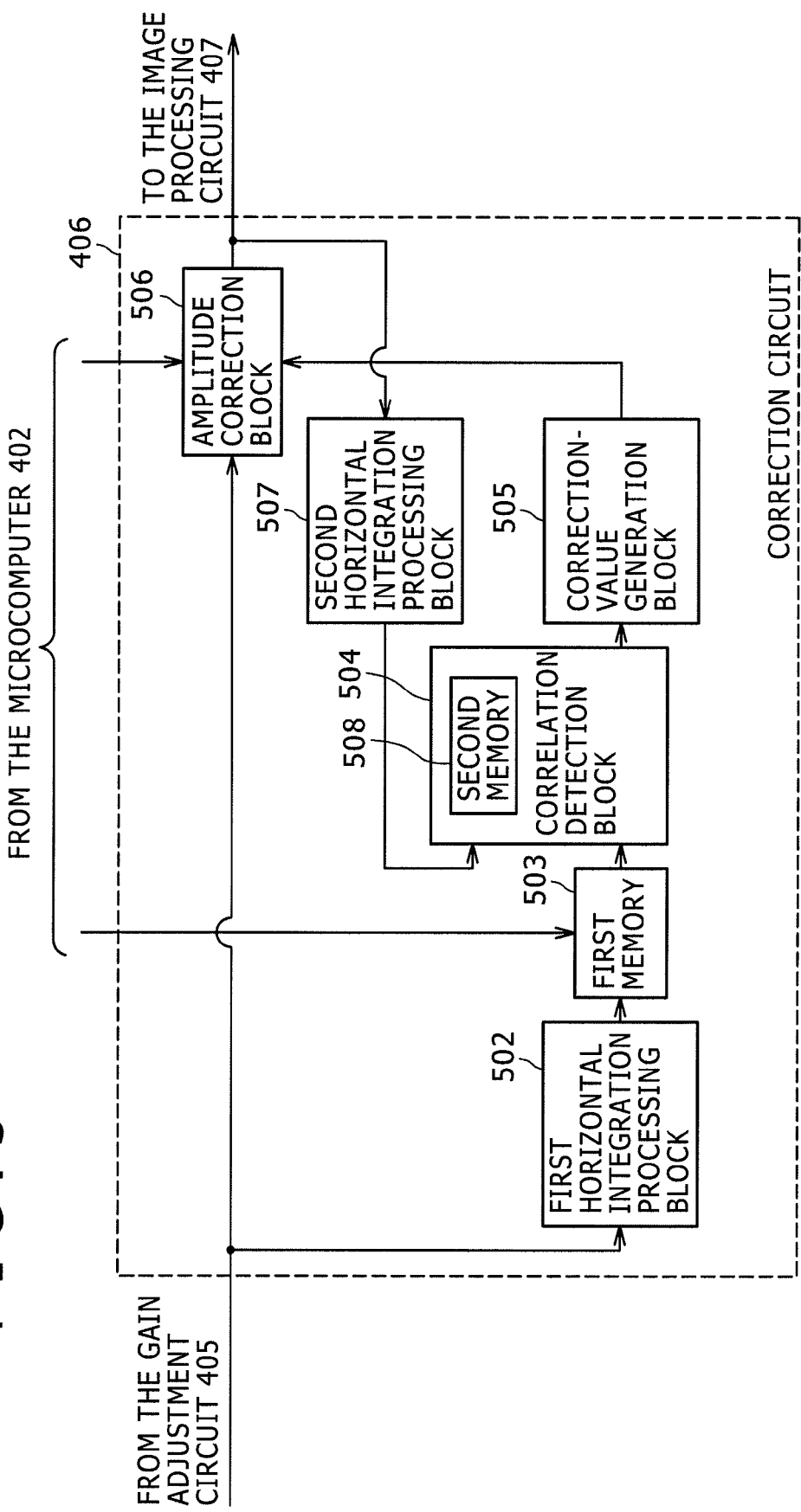
FIG. 5 is a block diagram showing a correction circuit employed in the image taking apparatus according to the embodiment of the present invention.

Next, the correction circuit 406 employed in the image taking apparatus 401 according to the embodiment is explained in detail. FIG. 5 is a block diagram showing the correction circuit 406 in the image taking apparatus 401.

A first horizontal integration processing block 502 employed in the correction circuit 406 shown in FIG. 5 is a block for computing a total luminance of pixels composing every horizontal line of an image represented by a reference video signal, which is received from the gain adjustment circuit 405, by making use of the reference video signal for every horizontal line. In the following description, the total luminance for a horizontal line is also referred to as reference value for the horizontal line. The first horizontal integration processing block 502 supplies the computed reference value to a first memory 503 for storing the reference value.

The second horizontal integration processing block 507 is a block for computing a total luminance of pixels composing every horizontal line of an image represented by the image taking video signal by making use of the video signal for every horizontal line (In the following description, this total luminance is also referred to as an image-taking value). The second horizontal integration processing block 507 supplies the computed image-taking value to a correlation detection block 504.

The correlation detection block 504 is a block for reading out reference value from the first memory 503 and finding a correlation between the reference value and an image-taking value received from the second horizontal integration processing block 507 as an image-taking value computed for the same horizontal line as the reference value for every horizontal line. To put it more concretely, the correlation detection block 504 computes the difference between the reference value and the image-taking value computed for the same horizontal line as the reference value for every horizontal line. In the following description, the difference between the reference value and the image-taking value is also referred to as a correlation value. It is to be noted that there are as many correlation values as horizontal lines of the image taking device 404.

Furthermore, the correlation detection block 504 computes a difference sum which is defined as the sum of the correlation values and stores the difference sum (or the correlation-value sum) in a second memory 508 employed in the correlation detection block 504. By making use of the correlation-value sum stored in the second memory 508, the correlation detection block 504 determines whether or not the amplitude correction process has been carried out properly by the amplitude correction block 506 as the signal processing mentioned above on the image taking video signal received from the gain adjustment circuit 405. If the amplitude correction block 506 has carried out the amplitude correction process properly on the image taking video signal received from the gain adjustment circuit 405, the proper amplitude correction process is reflected in the image-taking value of the image taking video signal received from the second horizontal integration processing block 507 and, thus, also reflected in the correlation-value sum stored in the second memory 508. As described above, the image taking video signal received from the second horizontal integration processing block 507 is a video signal obtained as a result of the signal processing carried out by the amplitude correction block 506 as the amplitude correction process. Then, on the basis of the outcome of the determination, the correlation detection block 504 controls a correlation-value generation block 505.

The correlation-value generation block 505 is provided with a ROM table used for storing waveforms with a variety of phases and a variety of amplitudes. Typical examples of the stored waveforms are a sinusoidal waveform and a half-wave rectification waveform. By referring to the ROM table, the correlation-value generation block 505 generates an initial waveform having an initial phase and an initial amplitude. The initial waveform is a correction waveform which is generated initially by the correlation-value generation block 505. In addition, on the basis of control executed by the correlation detection block 504, the correlation-value generation block 505 changes each of the phase and amplitude of the correction waveform by a predetermined increase or a predetermined decrease. It is to be noted that the decrease and the increase are determined by making use of the ROM table. The correction waveform is defined as the waveform of a correction signal for eliminating (or reducing) flickers from a video signal.

The amplitude correction block 506 is a block for carrying out an amplitude correction process as the aforementioned signal processing determined in advance on an image taking video signal which is received from the gain adjustment circuit 405 on the basis of the correction waveform (the correction signal) which is generated by the correlation-value generation block 505. The signal processing determined in advance is processing carried out by the amplitude correction block 506 on an image taking video signal supplied by the gain adjustment circuit 405 to the correction circuit 406 so that a video signal supplied by the correction circuit 406 to the display section 408 by way of the image processing circuit 407 is displayed by the display section 408 as a video which does not contain flickers. As will be described later, the predetermined signal processing carried out by the amplitude correction block 506 as the amplitude correction process is a part of a flicker correction process. To put it more concretely, on the basis of the correction waveform (the correction signal) having a phase opposite to the waveform 202 shown in the diagram of FIG. 2 as a waveform containing flickers, the amplitude correction block 506 adjusts the amplitude of the image taking video signal received from the gain adjustment circuit 405 in order to eliminate flickers from the video signal. Thus, the signal processing carried out by the amplitude correction block 506 is also referred to as an amplitude correction process of extracting a video from the image taking video signal as a video which is not affected by blinking light radiated by the light source. The amplitude correction block 506 supplies the image taking video signal obtained as a result of the amplitude correction process to the image processing circuit 407 and the second horizontal integration processing block 507.

If the user enters a reference-value using command to the microcomputer 402, the amplitude correction block 506 does not carry out an amplitude correction process on a video signal received from the gain adjustment circuit 405. Instead, the amplitude correction block 506 passes on the video signal to the image processing circuit 407 as it is. In this case, the microcomputer 402 controls the amplitude correction block 506 not to supply the video signal to the second horizontal integration processing block 507.

Operations of the Image Taking Apparatus According to the Embodiment

Figure 6:
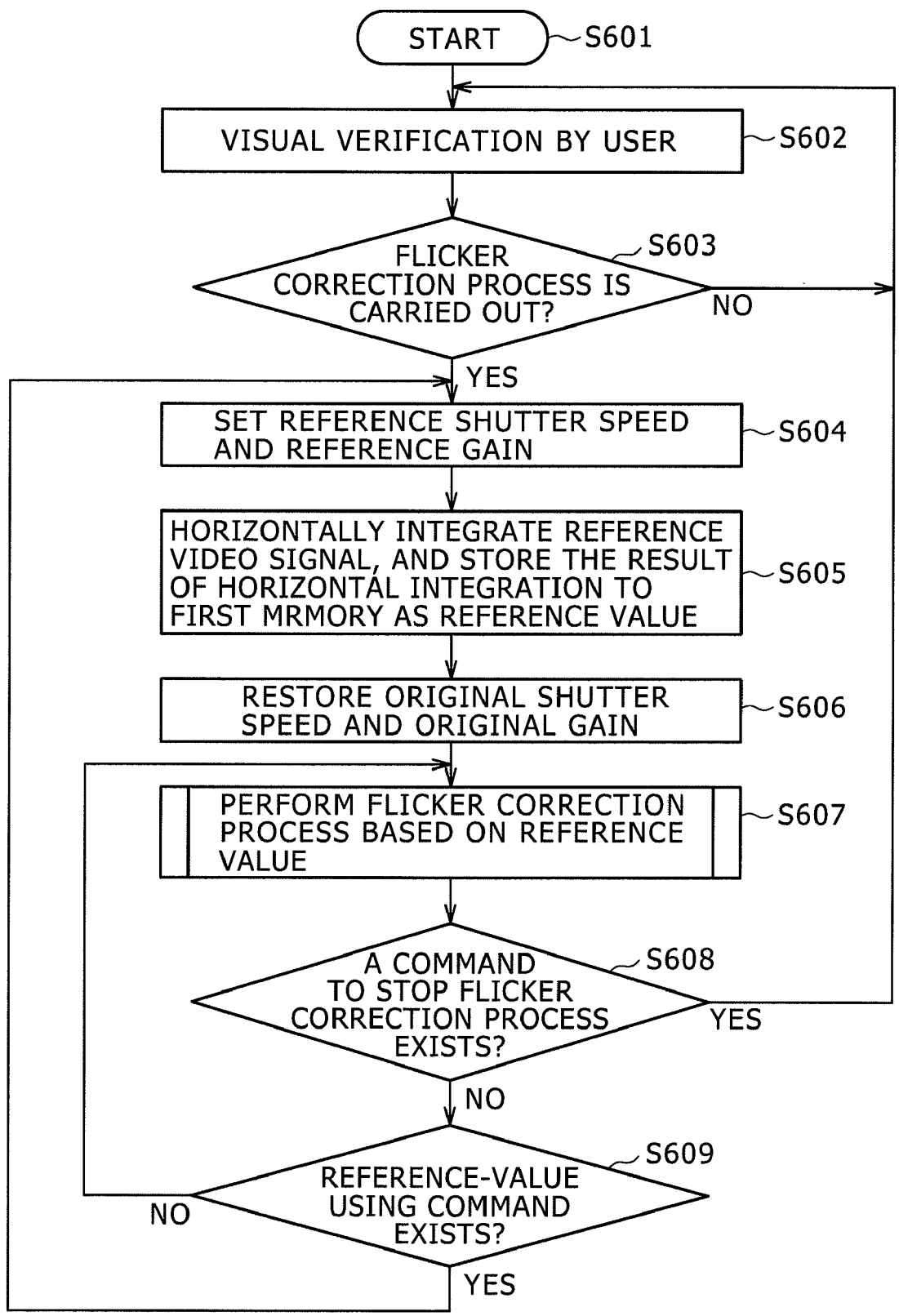
FIG. 6 shows a flowchart representing the sequence of operations carried out by the image taking apparatus according to the embodiment of the present invention.

By referring to a flowchart shown in FIG. 6, the following description explains the flow of processing carried out by a variety of functional blocks which compose the image taking apparatus 401.

FIG. 6 shows a flowchart representing the sequence of operations carried out by the image taking apparatus 401.

The user is allowed to change the shutter speed and the gain in the course of an image taking process, which is carried out by the video apparatus, by carrying out operations determined in advance on the operation section 403. The flowchart begins with a step S601 at which a shutter speed and a gain are set in the image taking device 404 and the gain adjustment circuit 405 respectively through the microcomputer 402. In the following description, the shutter speed set by the user in the process carried out at the step S601 is referred to as an image taking shutter speed whereas the gain set by the user in the process carried out at the step S601 is referred to as an image taking gain.

Then, at the next step S602, the user looks at the display section 408 in order to visually verify the existence or non-existence of a flicker in a present video currently obtained as a result of the image taking operation. Subsequently, at the next step S603, the microcomputer 402 makes a determination as to whether or not the user carries out a flicker correction process. If the outcome of the determination process carried out at the step S603 is NO indicating that a flicker correction process is not carried out, the flow of the processing goes back to the process of the step S602. If the outcome of the determination process carried out at the step S603 is YES indicating that a flicker correction process is carried out, the user has entered a reference-value using command to the microcomputer 402 by carrying out an operation determined in advance on the operation section 403.

At the step S604, the microcomputer 402 makes use of the reference-value using command as a trigger for setting a reference shutter speed in the image taking device 404 and a reference gain in the gain adjustment circuit 405.

Now, a detailed example of a reference shutter speed and a reference gain is explained. In accordance with condition (2) described earlier, the shutter speed at which no flicker is appeared in taken images is equal to the integral multiple of the blinking period of the fluorescent lamp. In this embodiment, the reference shutter speed is equivalent to a time period of 1/60 seconds. In addition, the microcomputer 402 sets the reference gain at such a value that the product of the reference shutter speed and the reference gain is equal to the product of the image taking shutter speed and the image taking gain. It is to be noted that, the reference shutter speed 1/60 seconds has the same effect as an image taking operation carried out without making use of the electronic shutter.

The explanation of the sequence of operations carried out by the image taking apparatus 401 as shown in the flowchart of FIG. 6 is resumed as follows.

After the execution of the process carried out at the step S604 has been completed, the flow of the processing goes on to a step S605 at which a video signal generated by the image taking device 404 at the reference shutter speed and then output by the gain adjustment circuit 405 as a signal produced at the reference gain is supplied to the first horizontal integration processing block 502. (In the following description, the video signal is referred to as a reference video signal.) The first horizontal integration processing block 502 computes a total luminance of pixels composing every horizontal line of an image represented by the reference video signal by horizontally integrating the reference video signal for every horizontal line (referred to as horizontal integration hereinafter). The first horizontal integration processing block 502 supplies the result of horizontal integration of a reference video signal as a reference value to a first memory 503 used for storing the reference value at the step S605.

Then, at the next step S606, the microcomputer 402 executes control to change the shutter speed set in the image taking device 404 from the reference shutter speed back to the image taking shutter speed and change the gain set in the gain adjustment circuit 405 from the reference gain back to the image taking gain.

Subsequently, a video signal generated by the image taking device 404 at the image taking shutter speed and then output by the gain adjustment circuit 405 as a signal produced at the image taking gain is supplied to the amplitude correction block 506. (In the following description, the video signal is referred to as an image taking video signal.) Then, at the next step S607, the correction circuit 406 carries out a flicker correction process on the image taking video signal on the basis of the reference value stored in the first memory 503. It is to be noted that, the flicker correction process for the image taking video signal is carried out by the second horizontal integration processing block 507, the correlation detection block 504, the correlation-value generation block 505 and the amplitude correction block 506. Details of the flicker correction process will be explained later by referring to diagrams of FIGS. 7 and 8.

After the execution of the process carried out at the step S607 has been completed, the flow of the processing goes on to a step S608 at which the microcomputer 402 makes a determination as to whether or not a command to stop the flicker correction process from the operation section 403 by the user exists. If the command to stop the flicker correction process exists (YES in the step S608), the flow of the processing goes back to the process of the step S602 in order to repeat the process of the step S602 and the processes of the subsequent processes following the step S602. If no command to stop the flicker correction process exists (NO in the step S608), the flow of the processing goes on to the process of the step S609 at which the microcomputer 402 makes a determination as to whether or not the user has operated the operation section 403 in order to enter a reference-value using command to again set the reference shutter speed and the reference gain in the image taking device 404 and the gain adjustment circuit 405 respectively (step S609). If no reference-value using command exists (NO in the step S609), the flow of the processing goes back to the process of the step S607 in order to perform the flicker correction process on the image taking video signal based on the same reference value (step S607).

If a reference-value using command exists (YES in the step S609), the flow of the processing goes on to the process of the step S604 in order to repeat the process of the step S604 and the processes of the subsequent processes following the step S604 in order to obtain a reference value again.

[Flicker Correction Process]

Figure 7:
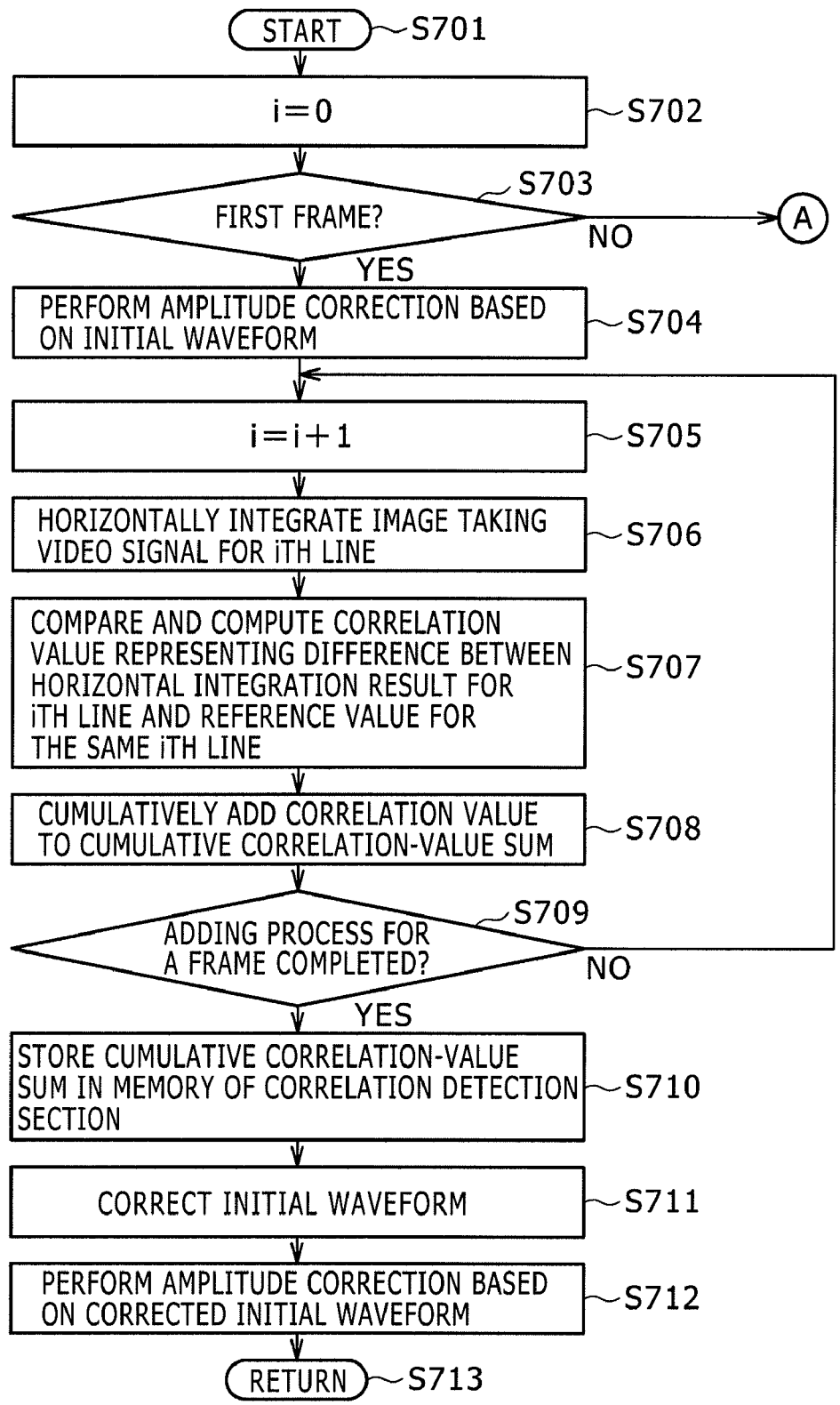
FIG. 7 shows a flowchart representing a detailed flow of a part of a flicker correction process.
Figure 8:
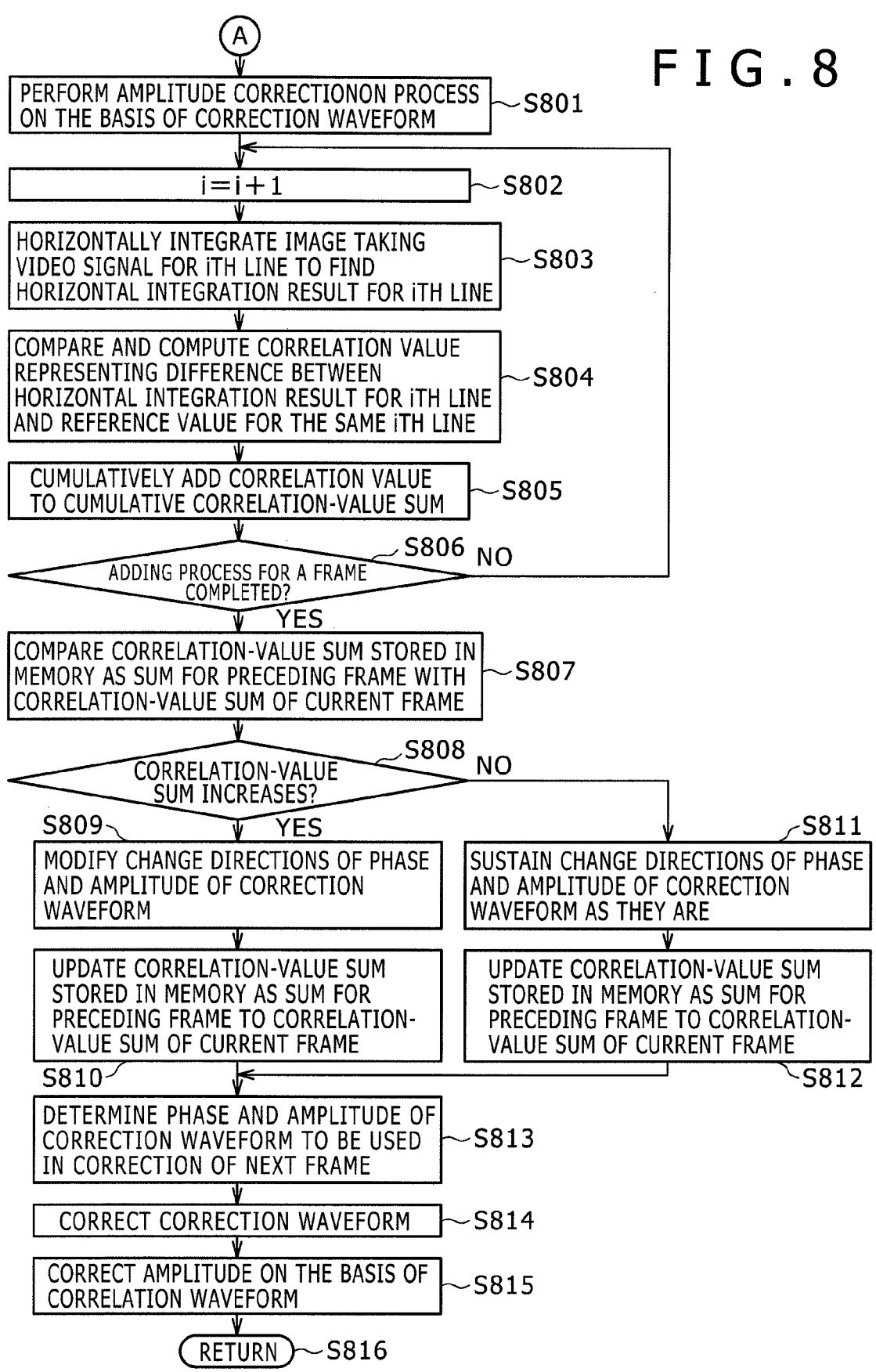
FIG. 8 shows a flowchart representing a detailed flow of another part of the flicker correction process.
Figure 9:
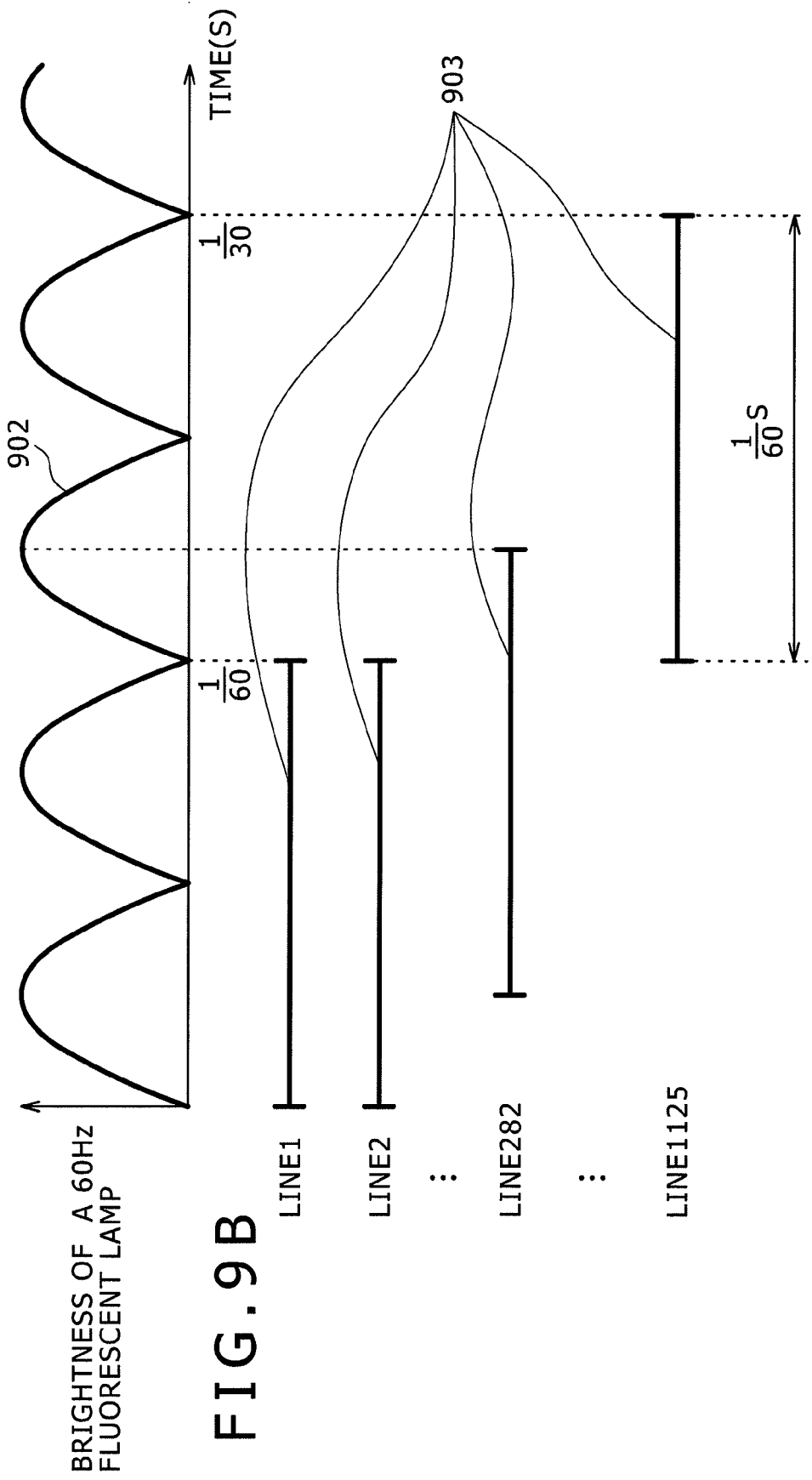
FIGS. 9A and 9B are a plurality of diagrams showing image taking light entering every horizontal line of an image taking device in an image taking operation which is carried out at a shutter speed at $\frac{1}{2000}$ seconds by making use of a fluorescent lamp with a power-supply frequency of 60 Hz.
Figure 10:
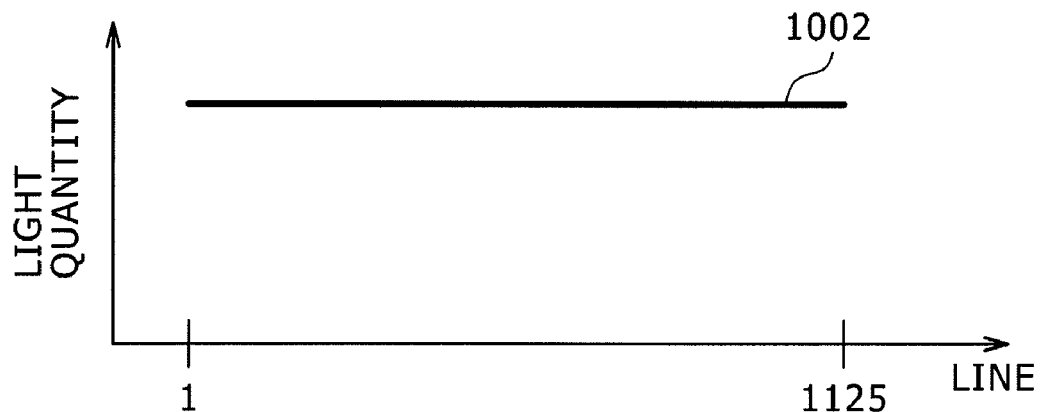
FIG. 10 is a diagram showing the quantity of light for every horizontal line of the image taking device.

FIGS. 7 and 8 show a flowchart representing a detailed flow of the flicker correction process carried out at the step S607 of the flowchart shown in FIG. 6. As described above, the flicker correction process is carried out by the second horizontal integration processing block 507, the correlation detection block 504, the correction-value generation block 505 and the amplitude correction block 506. The flicker correction process carried out on the image taking video signal is explained in detail as follows.

First of all, the flowchart representing the detailed flow of the flicker correction process begins with a step S701. Then, at the next step S702, the microcomputer 402 initializes a variable i, which is an integer used as a counter, at zero. The variable i is a number assigned to a horizontal line of a predetermined frame of an image represented by an image taking video signal.

Then, at the next step S703, the microcomputer 402 makes a determination as to whether or not an image represented by an image taking video signal supplied by the gain adjustment circuit 405 to the amplitude correction block 506 is the image of the first frame. If the outcome of the determination process carried out at the step S703 is YES indicating that the image represented by an image taking video signal supplied by the gain adjustment circuit 405 to the amplitude correction block 506 is the image of the first frame, the flow of the processing goes on to a step S704 at which the amplitude correction block 506 carries out an amplitude correction process on the image taking video signal by making use of an initial waveform. It is to be noted that the initial waveform is a waveform created by the correction-value generation block 505. In this embodiment, however, the initial waveform is a waveform having an initial phase and an initial amplitude.

After the execution of the above-described process has been completed, the flow of the processing goes on to a step S705 at which the microcomputer 402 increments the variable i by one. Then, at the next step S706, the second horizontal integration processing block 507 computes a sum of luminance values for the ith horizontal line of the image of the first frame represented by the image taking video signal by carrying out a horizontal integration process along the ith horizontal line. Subsequently, at the next step S707, the correlation detection block 504 computes a difference between the luminance sum obtained as a result of the horizontal integration process carried out along the ith horizontal line and a reference value for the ith horizontal line. In the following description, the difference between the luminance sum and a reference value for the same ith horizontal line is referred to as a correlation value for the ith horizontal line described above. Then, at the next step S708, the correlation detection block 504 adds the correlation value found for the ith horizontal line to a cumulative sum of such correlation values. That is to say, at the end of first execution of processes in a loop from the step S705 to a step S708, the cumulative sum of such correlation values is equal to a correlation value representing the difference between the luminance sum obtained as a result of the horizontal integration process carried out along the first horizontal line and a reference value for the first horizontal line. Then, at the end of second execution of the loop, the cumulative sum of such correlation values is equal to the sum of the cumulative sum of such correlation values for the first horizontal line and a correlation value representing the difference between the luminance sum obtained as a result of the horizontal integration process carried out along the second horizontal line and a reference value for the second horizontal line. Subsequently, at the end of third execution of the loop, the cumulative sum of such correlation values is equal to the sum of the cumulative sum of such correlation values for the first and second horizontal lines and a correlation value representing the difference between the luminance sum obtained as a result of the horizontal integration process carried out along the third horizontal line and a reference value for the third horizontal line. Finally, at the end of the last execution of the loop, the cumulative sum of such correlation values becomes equal to the cumulative sum of such correlation values for all the horizontal lines composing one frame.

Then, after the execution of the process of the step S708 has been completed, the flow of the processing goes on to a step S709 at which the correlation detection block 504 makes a determination as to whether or not all the 1125 horizontal lines composing a frame have been processed to compute correlation values which are cumulatively added to the cumulative sum of such correlation values. If the outcome of the determination process carried out at the step S709 is NO indicating that not all the 1125 horizontal lines composing a frame have been processed to compute the cumulative sum of correlation values, that is, if the present value of the variable i is smaller than 1125, the flow of the processing goes back to the step S705 in order to repeat the process of the step S705 and the processes of the subsequent steps following the step S705.

If the present value of the variable i is not smaller than 1125 (YES in the step S709), the flow of the processing goes on to a step S710 at which the correlation detection block 504 stores the correlation-value cumulative sum found in the processes of a loop from the step S705 to the step S708 in a second memory 508 employed internally in the correlation detection block 504.

Then, at the next step S711, in accordance with control executed by the correlation detection block 504, the correction-value generation block 505 carries out a correction process on the initial waveform (correction waveform). The control executed by the correlation detection block 504 is control to determine a proper direction in which the correction-value generation block 505 is supposed to change the phase and amplitude of the initial waveform. A direction in which the correction-value generation block 505 increases the phase and amplitude of the initial waveform is referred to as a + direction. On the other hand, a direction in which the correction-value generation block 505 decreases the phase and amplitude of the initial waveform is referred to as a − direction.

Subsequently, at the next step S712, on the basis of the correction waveform generated by the correction-value generation block 505, the amplitude correction block 506 corrects the image taking video signal received from the gain adjustment circuit 405. Then, at the next step S713, the flow of the processing returns to the process of the step S608 of the flowchart shown in FIG. 6.

If the outcome of determination process carried out at the step S703 is NO indicating that the image represented by an image taking video signal is the image of the second or subsequent frame, the flow of the processing goes on to a step S801 of the flowchart shown in FIG. 8. At the step S801, the amplitude correction block 506 carries out an amplitude correction process on the image taking video signal on the basis of the correction waveform generated by the correction-value generation block 505.

Then, at the next step S802, the microcomputer 402 increments the variable i by one. After that, at the next step S803, the second horizontal integration processing block 507 computes a sum of luminance values for the ith horizontal line of the image of the frame represented by the image taking video signal by carrying out a horizontal integration process along the ith horizontal line. The sum of luminance values for the ith horizontal line is also referred to as the image taking value of the ith horizontal line. As is obvious from the above description, in this case, the frame is the second or subsequent frame. Subsequently, at the next step S804, the correlation detection block 504 compares and computes a difference between the luminance sum obtained as a result of the horizontal integration process carried out along the ith horizontal line and a reference value for the same ith horizontal line. As described previously, the difference between the luminance sum and a reference value for the same ith horizontal line is referred to as a correlation value for the ith horizontal line.

Then, at the next step S805, the correlation detection block 504 adds the correlation value found for the ith horizontal line to a cumulative sum of such correlation values. That is to say, at the end of first execution of processes in a loop from the step S802 to a step S805, the cumulative sum of such correlation values is equal to a correlation value representing the difference between the luminance sum and a reference value for the first horizontal line. Then, at the end of second execution of the loop, the cumulative sum of such correlation values is equal to the sum of the cumulative sum of such correlation values for the first horizontal line and a correlation value representing the difference between the luminance sum and a reference value for the second horizontal line. Subsequently, at the end of third execution of the loop, the cumulative sum of such correlation values is equal to the sum of the cumulative sum of such correlation values for the first and second horizontal lines and a correlation value representing the difference between the luminance sum and a reference value for the third horizontal line.

Then, after the execution of the process of the step S805 has been completed, the flow of the processing goes on to a step S806 at which the correlation detection block 504 makes a determination as to whether or not all the 1125 horizontal lines composing a frame have been processed to compute correlation values which are cumulatively added to the cumulative sum of such correlation values. If the outcome of the determination process carried out at the step S806 is NO indicating that not all the 1125 horizontal lines composing a frame have been processed to compute the cumulative sum of correlation values, that is, if the present value of the variable i is smaller than 1125, the flow of the processing goes back to the step S802.

If the outcome of the determination process carried out at the step S806 is YES indicating that all the 1125 horizontal lines composing a frame have been processed to compute the cumulative sum of correlation values, that is, if the present value of the variable i is not smaller than 1125, the flow of the processing goes on to a step S807 at which the correlation detection block 504 compares a correlation-value sum stored in the second memory 508 as the correlation-value sum of a frame immediately leading ahead of the present frame with the correlation-value sum computed in the process carried out at the step S805 in the last execution of the loop described above as the correlation-value sum of the present frame. Then, at the next step S808, the correlation detection block 504 makes a determination as to whether or not the correlation-value sum computed for the present frame is greater than the correlation-value sum computed for the frame immediately leading ahead of the present frame. If the outcome of the determination process carried out at the step S808 is YES indicating that the correlation-value sum computed for the present frame is greater than the correlation-value sum computed for the frame immediately leading ahead of the present frame, the flow of the processing goes on to a step S809 at which the correlation detection block 504 issues a command to the correction-value generation block 505 to serve as a command requesting the correction-value generation block 505 to change the phase and amplitude of the correction waveform generated at a time preceding the present time by a period corresponding to one frame. Then, at the next step S810, the correlation detection block 504 updates the correlation-value sum stored in the second memory 508 to serve as the correlation-value sum computed for the frame immediately leading ahead of the present frame to the correlation-value sum computed for the present frame. Subsequently, at the next step S813, the correction-value generation block 505 determines the phase and amplitude of the correction waveform on the basis of the command received from the correlation detection block 504.

If the outcome of the determination process carried out at the step S808 is NO indicating that the correlation-value sum of the present frame is not greater than the correlation-value sum of the frame immediately leading ahead of the present frame, the flow of the processing goes on to a step S811 at which the correlation detection block 504 issues a command to the correction-value generation block 505 to serve as a command requesting the correction-value generation block 505 to keep the change directions of the phase and amplitude of the correction waveform generated at a time preceding the present time by a period corresponding to one frame as they are. Then, at the next step S812, the correlation detection block 504 updates the correlation-value sum stored in the second memory 508 to serve as the correlation-value sum computed for the frame immediately leading ahead of the present frame to the correlation-value sum of the present frame. Subsequently, at the next step S813, the correction-value generation block 505 determines the phase and amplitude of the correction waveform on the basis of the command received from the correlation detection block 504.

Then, after the execution of the process of the step S813 has been completed, the flow of the processing goes on to a step S814 at which the correction-value generation block 505 generates a correction waveform having a phase and an amplitude which have been determined by the correlation detection block 504. Then, at the next step S815, the amplitude correction block 506 corrects the image taking video signal received from the gain adjustment circuit 405 on the basis of the correction waveform which has been generated by the correction-value generation block 505. Subsequently, at the next step S816, the flow of the processing returns to the process of the step S608 of the flowchart shown in FIG. 6.

The processes carried out at the steps S808 to S813 as described above to correct the phase and amplitude of the correction waveform are explained in detail as follows.

The correlation detection block 504 detects a correlation-value sum computed for the present frame as a correlation-value sum to be used for making a determination as to how far a post-correction video approaches a reference video. Then, from the detected correlation-value sum, the determination process carried out by the correlation detection block 504 at the step S808 is a process to make a determination as to whether the correlation of the present frame with respect to a reference frame is strong or weak and also a determination as to whether or not the correction policy adopted for the present frame has been correct, that is, whether or not the change directions of the phase and amplitude of the correction waveform have been correct. If the outcome of the determination process indicates that the correlation-value sum obtained as a result of the present flicker correction process carried out for the present frame is greater than the correlation-value sum obtained as a result of a flicker correction process carried out for the frame immediately leading ahead of the present frame as a flicker correction process immediately preceding the present flicker correction process, that is, if the outcome of the determination indicates that the correlation of the present frame with respect to a reference frame has become weaker, the correlation detection block 504 regards the correction policy as an incorrect policy. In this case, the change directions of the phase and amplitude of the correction waveform serving as the subject of correction are reversed in the process carried out at the step S809.

If the outcome of the determination indicates that the correlation-value sum obtained as a result of the present flicker correction process carried out for the present frame is not greater than the correlation-value sum obtained as a result of a flicker correction process carried out for the frame immediately leading ahead of the present frame as a flicker correction process immediately preceding the present flicker correction process, that is, if the outcome of the determination indicates that the correlation of the present frame with respect to a reference frame has become stronger, the correlation detection block 504 regards the correction policy as a correct policy. In this case, the change directions of the phase and amplitude of the correction waveform serving as the subject of correction are sustained as they are in the process carried out at the step S811. In accordance with a determination outcome described above, the correlation detection block 504 generates a control signal for changing the change directions of the phase and amplitude of the correction waveform and supplies the control signal to the correction-value generation block 505. As described above, a direction in which the correction-value generation block 505 increases the phase and amplitude of the correction waveform is referred to as a + direction. On the other hand, a direction in which the correlation-value generation block 505 decreases the phase and amplitude of the correction waveform is referred to as a − direction.

Then, on the basis of the control signal received from the correlation detection block 504, the correction-value generation block 505 corrects (or changes) the phase and amplitude of the generated correction waveform. Thus, the correction waveform is corrected in a direction in which the sum of correlation values is gradually decreasing. As a result, the video signal is approaching a video signal in which a flicker component superposed thereon is inverted (or reversed upside down).

FIGS. 9A and 9B are a plurality of diagrams showing image taking light which enters every horizontal line of an image taking device 404 when the microcomputer 402 issues a reference-value using command to the image taking device 404.

To be more specific, FIG. 9A is a diagram showing a graph representing changes of the brightness of a 60-Hz fluorescent lamp along the time axis.

The vertical axis of diagram is the brightness of the 60-Hz fluorescent lamp. The horizontal axis of diagram is the time axis. As is obvious from a waveform 902, the blinking period of the fluorescent lamp is a period which is a frequency of 120 Hz.

FIG. 9B is a diagram showing relations between the horizontal lines and the aforementioned reference shutter speed.

As described before, the frame rate of a video obtained as a result of an image taking operation carried out by making use of the image taking device 404 is 60 frames per second. That is to say, the time that it takes to take the image of the first frame is 1/60 seconds. In the case of a shutter speed at 1/60 seconds as a reference shutter speed which has the same effect as an image taking operation carried out by making use of no electronic shutter of the image taking device 404, the exposure time 903 of every horizontal line of the image taking device 404 is 1/60 seconds. As explained previously, this exposure time 903 of 1/60 seconds is the exposure time in which no flicker is generated in a video obtained as a result of an image taking operation carried out by making use of a fluorescent lamp having a power-supply frequency of 60 Hz. That is to say, the exposure time in which no flicker is generated in a video obtained as a result of an image taking operation carried out by making use of a fluorescent lamp having a power-supply frequency of 60 Hz is the reference shutter speed described above.

The timing to start the exposure process of a horizontal line of the image taking device 404 varies from line to line whereas, in this embodiment, the frame rate of a video obtained as a result of an image taking operation carried out by making use of the image taking device 404 is 60 frames per second. In addition, if the number of horizontal lines of the image taking device 404 is 1125, the shift between the exposure start times of every two horizontal lines adjacent to each other is (1/60)/1125 seconds.

If the image taking operation is carried out with the speed of the electronic shutter set at 1/60 seconds as described above, the quantity of light entering each horizontal line of the image taking device 404 as a result of illumination making use of a fluorescent lamp can be computed by integrating the waveform 902 over the exposure time 903 of each horizontal line. In the following description, the quantity of light entering each horizontal line of the image taking device 404 as a result of illumination making use of a fluorescent lamp is referred to as the light quantity of a fluorescent lamp. As shown in a diagram of FIG. 10, the light quantity of a fluorescent lamp is a constant 102 which is not dependent on the horizontal line.

Figure 11:
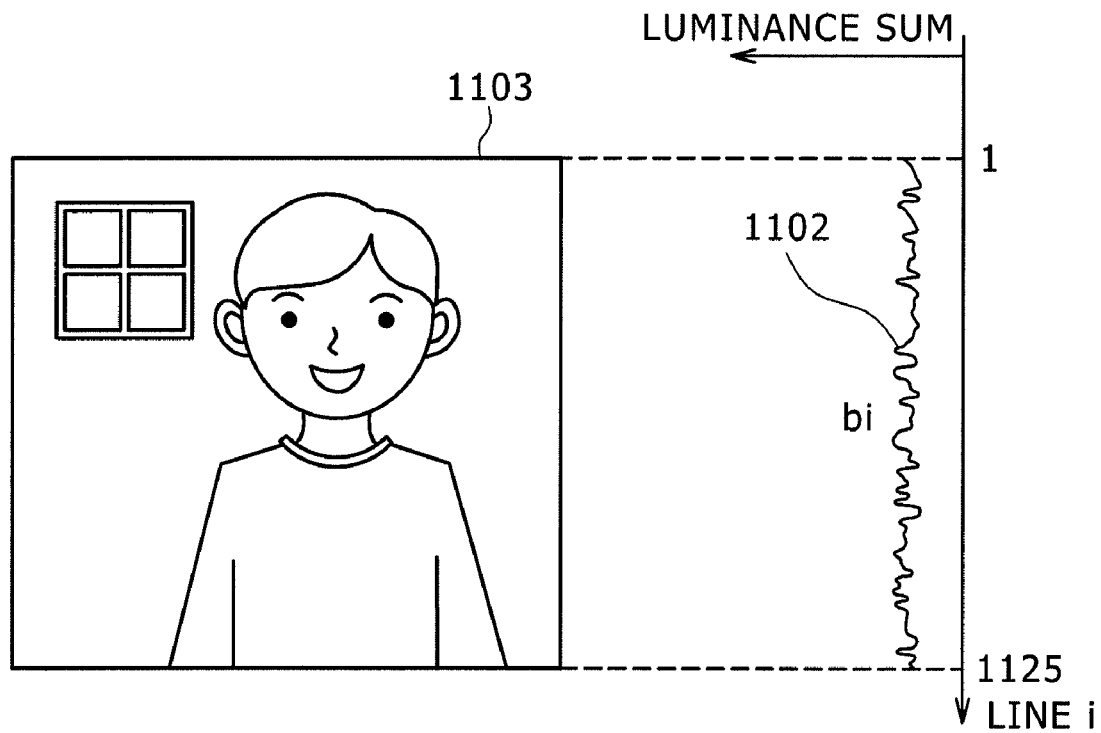
FIG. 11 is a diagram showing a reference image which is used for generating reference values.

That is to say, if an image of a predetermined subject of an image taking operation is taken by making use of a fluorescent lamp having a power-supply frequency of 60 Hz with the speed of the electronic shutter set at 1/60 seconds, the result of the image taking operation is an image 1103 of a frame which does not generate a flicker shown in a diagram of FIG. 11. The image 1103 is an image represented by a reference video signal.

Since the light quantity of the fluorescent lamp is determined by the quantity of light reflected by the subject of the image taking operation, the luminance of each horizontal line of the image 1103 changes in accordance with a waveform 1102 which is shown in a diagram of FIG. 11. As described above, the light quantity of the fluorescent lamp is the constant 1002 shown in the diagram of FIG. 10. This waveform 1102 corresponds to the reference values generated in the process which is carried out at the step S605 of the flowchart shown in FIG. 6. In this embodiment, each of the reference values represented by the waveform 1102 is referred to as a quantity $b_i$ where suffix i is a variable which is a number assigned to a horizontal line.

[Outline of the Flicker Correction Process]

Figure 12:
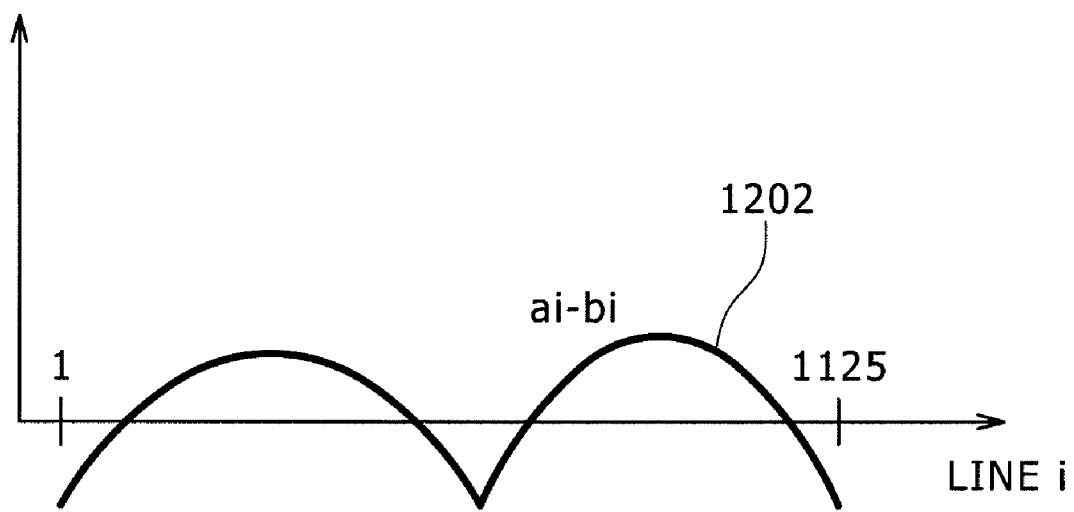
FIG. 12 is a waveform diagram showing the shape of flickers.
Figure 13:
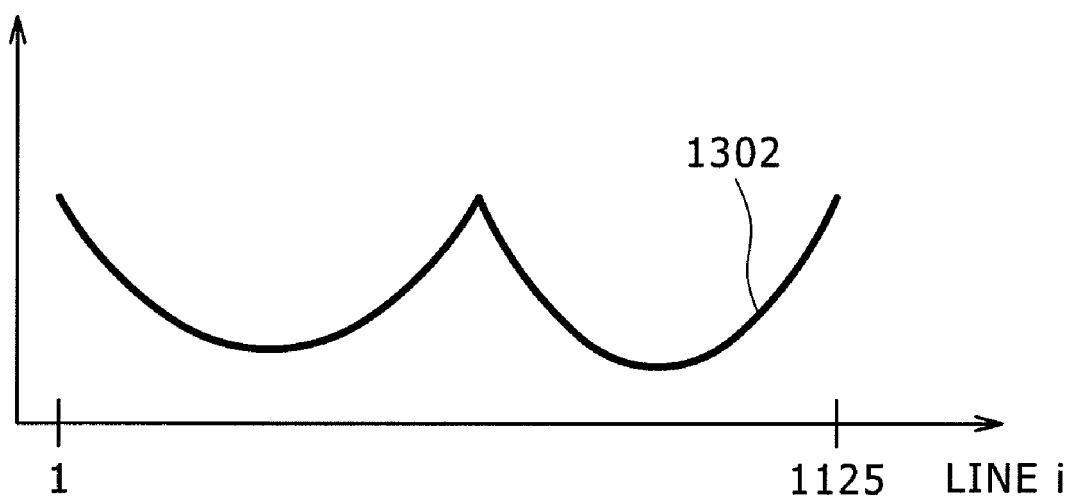
FIG. 13 is a diagram showing an ideal correction waveform for eliminating flickers.
Figure 14:
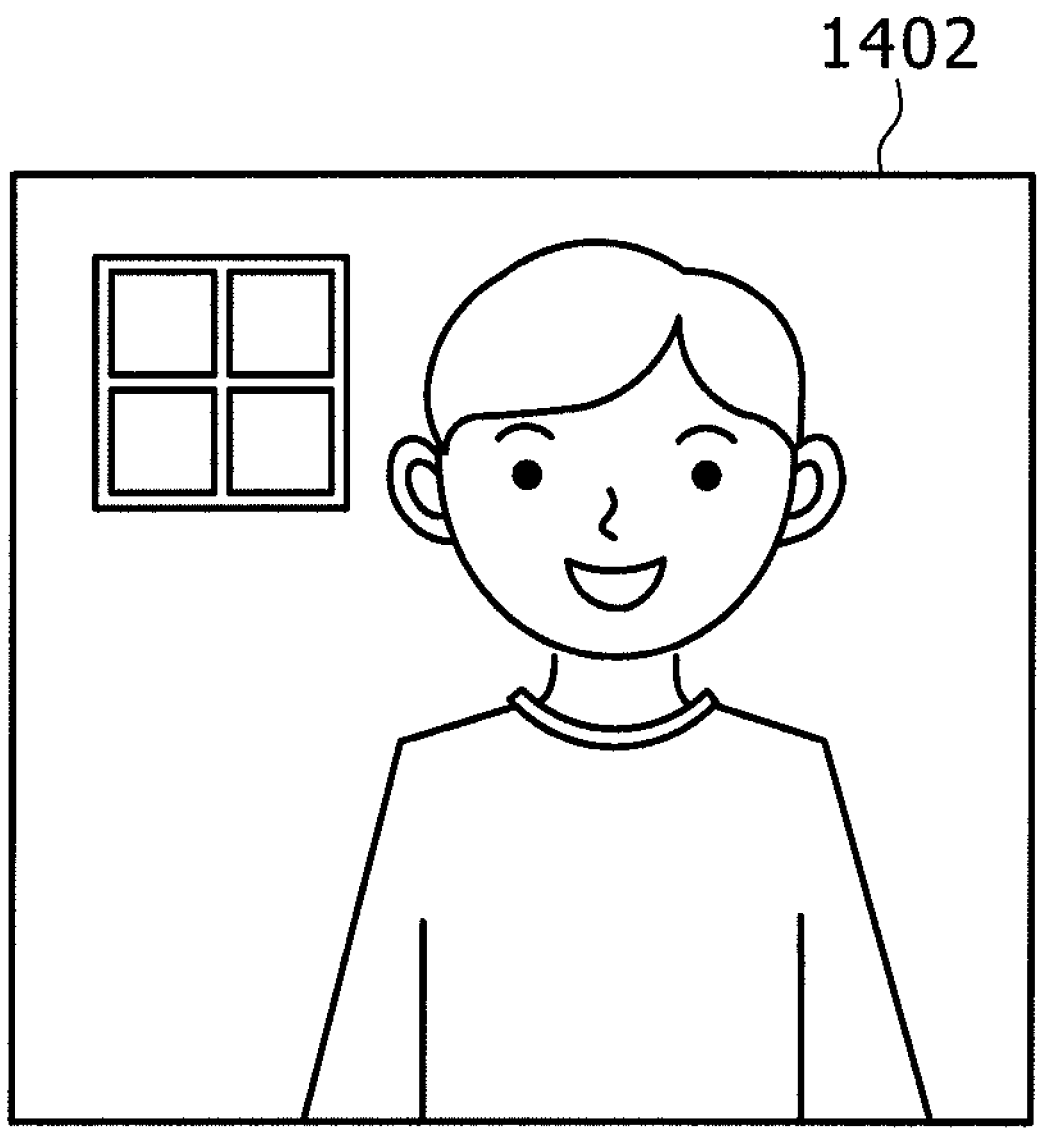
FIG. 14 is a diagram showing an image which is obtained as a result of a flicker correction process.

Next, an outline of the flicker correction process is explained by referring to diagrams of FIGS. 12 and 13.

Figure 1:
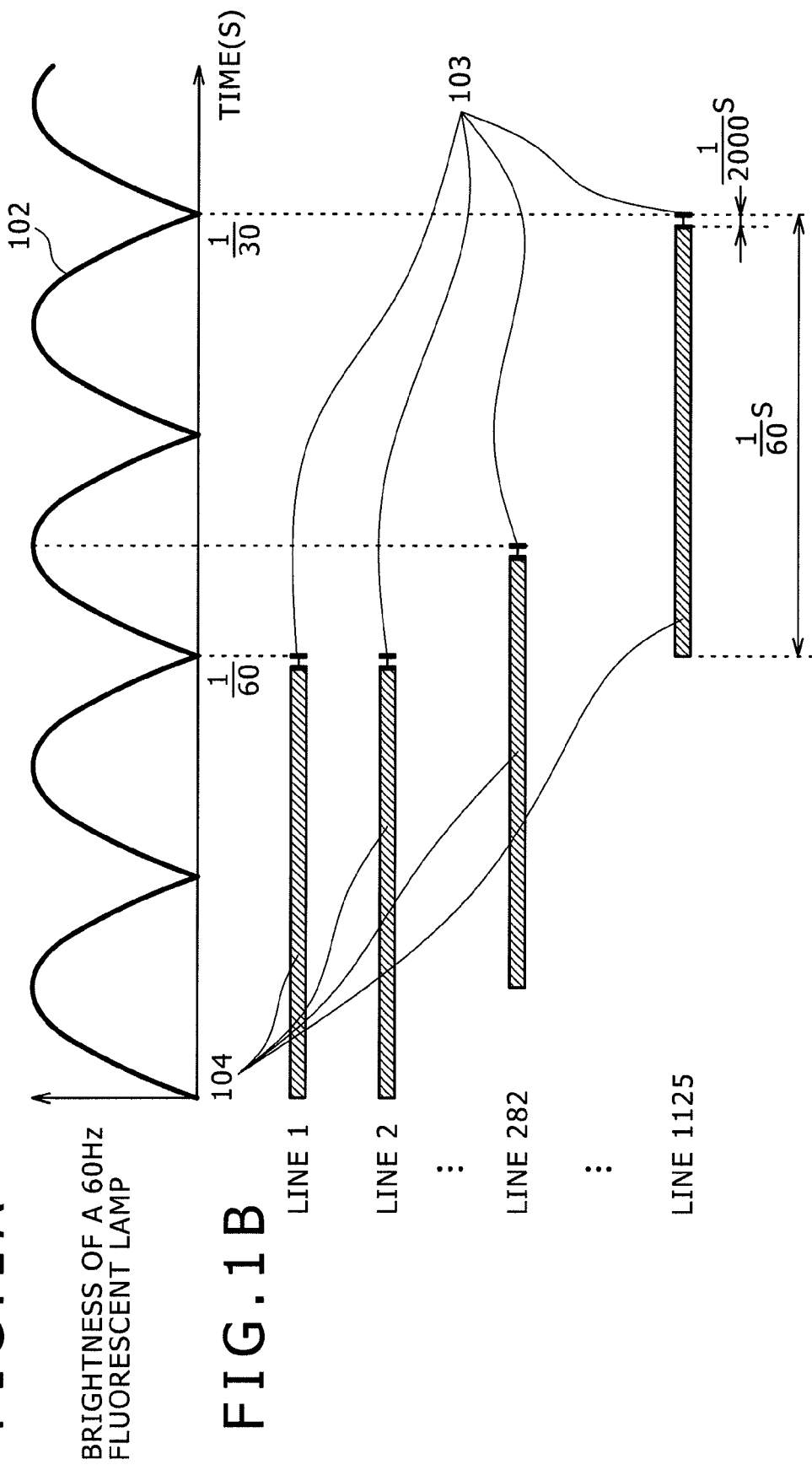
FIGS. 1A and 1B are a plurality of diagrams showing exposure timings of horizontal lines of a CMOS device which operates in an image taking operation carried out by making use of a fluorescent lamp with a power-supply frequency of 60 Hz.
Figure 2:
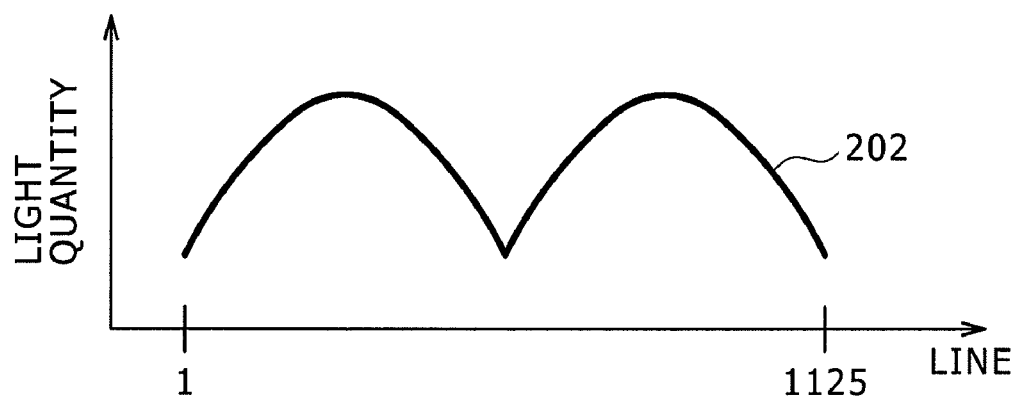
FIG. 2 is a diagram showing the quantity of light for every horizontal line of a CMOS device.
Figure 3:
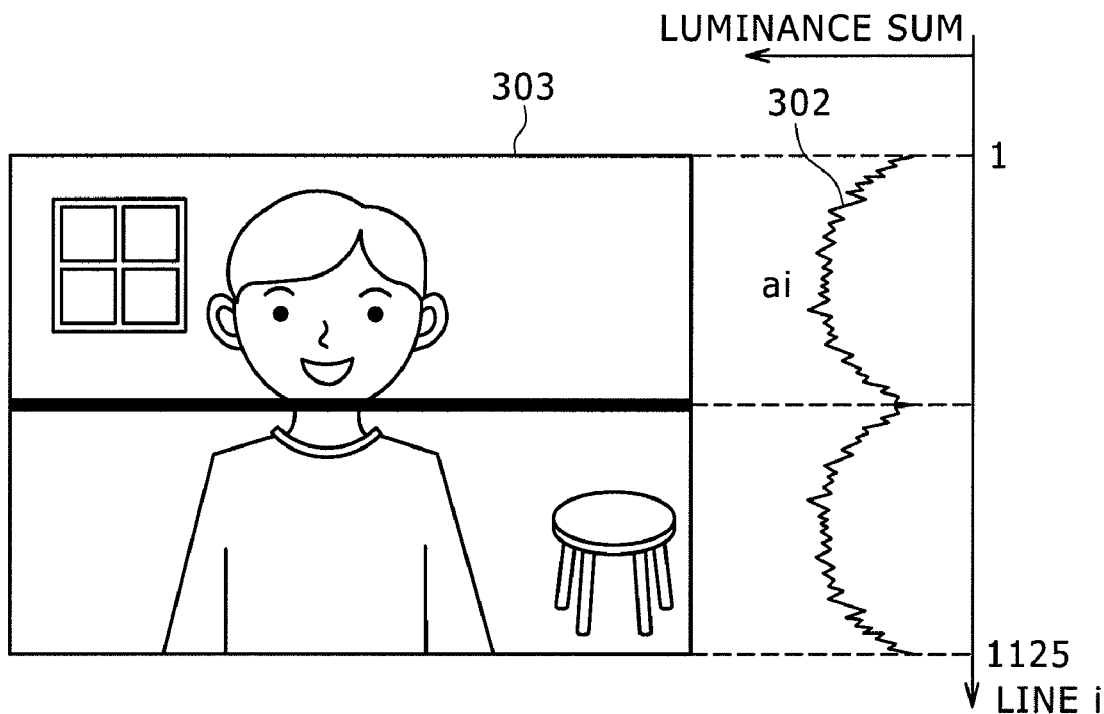
FIG. 3 is a diagram showing an image which contains a flicker.

To be more specific, the following description explains a typical flicker correction process carried out on an image 303 which is shown in the diagram of FIG. 3 as an image containing flickers. The image 303 is an image represented by an image taking video signal generated by the gain adjustment circuit 405 in an image taking operation which is carried out by making use of a fluorescent lamp having a power-supply frequency of 60 Hz with the speed of the electronic shutter set at 1/2000 seconds. Since the fluorescent-lamp light quantity changing in accordance with a waveform 202 shown in the diagram of FIG. 2 is determined by the quantity of light reflected by the subject of the image taking operation, the luminance of each horizontal line of such an image 303 changes in accordance with a waveform 302 which is shown in a diagram of FIG. 3. This waveform 302 corresponds to the image taking values found in the processes of a loop in the steps S802 to S805 of the flowchart shown in FIG. 8. In this embodiment, each of the image values represented by the waveform 302 is referred to as a quantity $a_i$ where suffix i is a variable which is a number assigned to a horizontal line.

By the way, in this embodiment, the correlation detection block 504 computes differences between the waveform 302 shown in the diagram of FIG. 3 to serve as a waveform representing image taking values and the waveform 1102 shown in the diagram of FIG. 11 to serve as a waveform representing reference values in order to produce correlation values. That is to say, the correlation values are $|a_i - b_i|$ which represents differences between the quantities $b_i$ and $a_i$. A waveform 1202 shown in the diagram of FIG. 12 is a waveform excluding the absolute values of the correlation values produced by the correlation detection block 504. The vertical axis of the diagram of FIG. 12 represents the luminance. The horizontal axis of the same diagram represents each horizontal line of the image taking device 404. The waveform 1202 is a waveform showing the shape of flickers contained in an image which is displayed on the display section 408. In the following description, the flicker shape represented by the waveform 1202 is referred to as a flicker component. That is to say, in a broad sense, a correlation value is a value showing the shape of flickers contained in an image which is displayed on the display section 408.

Then, the correlation detection block 504 computes a correlation-value sum explained earlier from the correlation values and stores the correlation-value sum in the second memory 508. An equation used for computing the correlation-value sum stored in the second memory 508 is given as follows:

Correlation-value sum=Σ|ai−bi|

For example, let the correlation-value sum currently stored in the second memory 508 be a sum which has been computed from correlation values of an image taking video signal representing the image of the nth frame. In the following description, the image taking video signal representing the image of the nth frame is referred to simply as an image taking video signal for the nth frame. In this case, the correlation-value sum currently stored in the second memory 508 is used in a process which is carried out by the correlation detection block 504 to determine whether or not the image taking video signal for the (n+1)th frame has been subjected to a proper flicker correction process when the image taking values of the image taking video signal for the (n+1)th frame are supplied to the correlation detection block 504. In addition, the correlation-value sum currently stored in the second memory 508 is also used in a process which is carried out by the correlation detection section 504 to issue a command to change the phase and amplitude of a correction waveform to the correction-value generation block 505. The process carried out by the correlation detection block 504 to issue a command to change the phase and amplitude of a correction waveform to the correction-value generation block 505 corresponds to the process performed at the step S813 of the flowchart shown in FIG. 8.

On the basis of a command issued by the correlation detection block 504 to the correction-value generation block 505 to serve as a command to change the phase and amplitude of a correction waveform, the correction-value generation block 505 corrects the correction waveform. FIG. 13 is a diagram showing an ideal correction waveform 1302 used for eliminating flickers. The vertical axis of the diagram of FIG. 13 represents the amplitude of the correction waveform. The horizontal axis of the same diagram represents each horizontal line of the image taking device 404. The correction waveform 1302 shown in the diagram of FIG. 13 has a phase opposite to that of the waveform 1202 which is shown in the diagram of FIG. 12. That is to say, the correction waveform 1302 is a waveform which has a phase opposite to changes of the light quantity related to flickers. On the basis of a command issued by the correlation detection block 504 to the correction-value generation block 505 to serve as a command to change the phase and amplitude of a correction waveform, the correction-value generation block 505 changes the phase and amplitude of the correction waveform so that the correction waveform approaches the correction waveform 1302 shown in the diagram of FIG. 13. The process carried out by the correction-value generation block 505 to change the phase and amplitude of the correction waveform corresponds to the process performed at the step S711 of the flowchart shown in FIG. 7 and the process performed at the step S814 of the flowchart shown in FIG. 8.

On the basis of the correction waveform 1302 received from the correction-value generation block 505, the amplitude correction block 506 carries out an amplitude correction process as a part of the flicker correction process on an image taking video signal received from the gain adjustment circuit 405. That is to say, since the correction waveform 1302 is a waveform which has a phase opposite to the luminance changes caused by flickers generated in the image 302 shown in the diagram of FIG. 3, flickers contained in the image taking video signal can be eliminated by making use of this correction waveform 1302. The process carried out by the amplitude correction block 506 to eliminate flickers from the image taking video signal corresponds to the process performed at the step S712 of the flowchart shown in FIG. 7 and the process performed at the step S814 of the flowchart shown in FIG. 8.

Then, the amplitude correction block 506 employed in the correction circuit 406 supplies the image taking video signal obtained as a result of the amplitude correction process carried out as a part of the flicker correction process to the display section 408 by way of the image processing circuit 407. Subsequently, the display section 408 displays an image shown in a diagram of FIG. 14 on the screen thereof as an image which does not contain a flicker.

As described above, in this embodiment, it is possible to easily detect the phase of flickers having a standstill phase for every frame and correct the flickers.

In addition, in this embodiment, the microcomputer 402 controls the gain adjustment circuit 405 and the image taking device 404 in order to sustain the product of the shutter speed and the gain at a constant. Thus, a change of the signal level from a frame to another can also be sustained at a constant as well. Therefore, the brightness of a video displayed on the display section 408 as a result of the flicker correction process becomes equal to the brightness of a video displayed on the display section 408 as a video which is generated on the basis of input reference values. As a result, it is possible to display a presentable video to the user on the display section 408.

Other Embodiment

Configuration of an Image Taking Apparatus According to Another Embodiment

Another typical embodiment of the present invention is explained by referring to diagrams of FIGS. 15 to 17 as follows.

Figure 15:
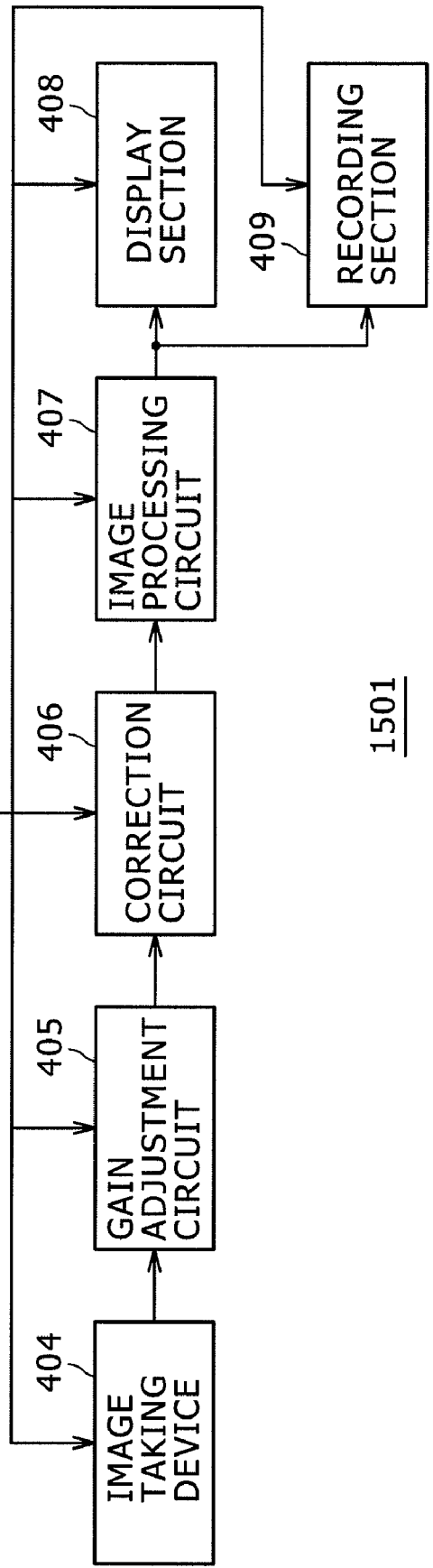
FIG. 15 is a functional block diagram showing an image taking apparatus according to another embodiment of the present invention.

FIG. 15 is a block diagram showing an image taking apparatus 1501 according to the other embodiment.

Figure 16:
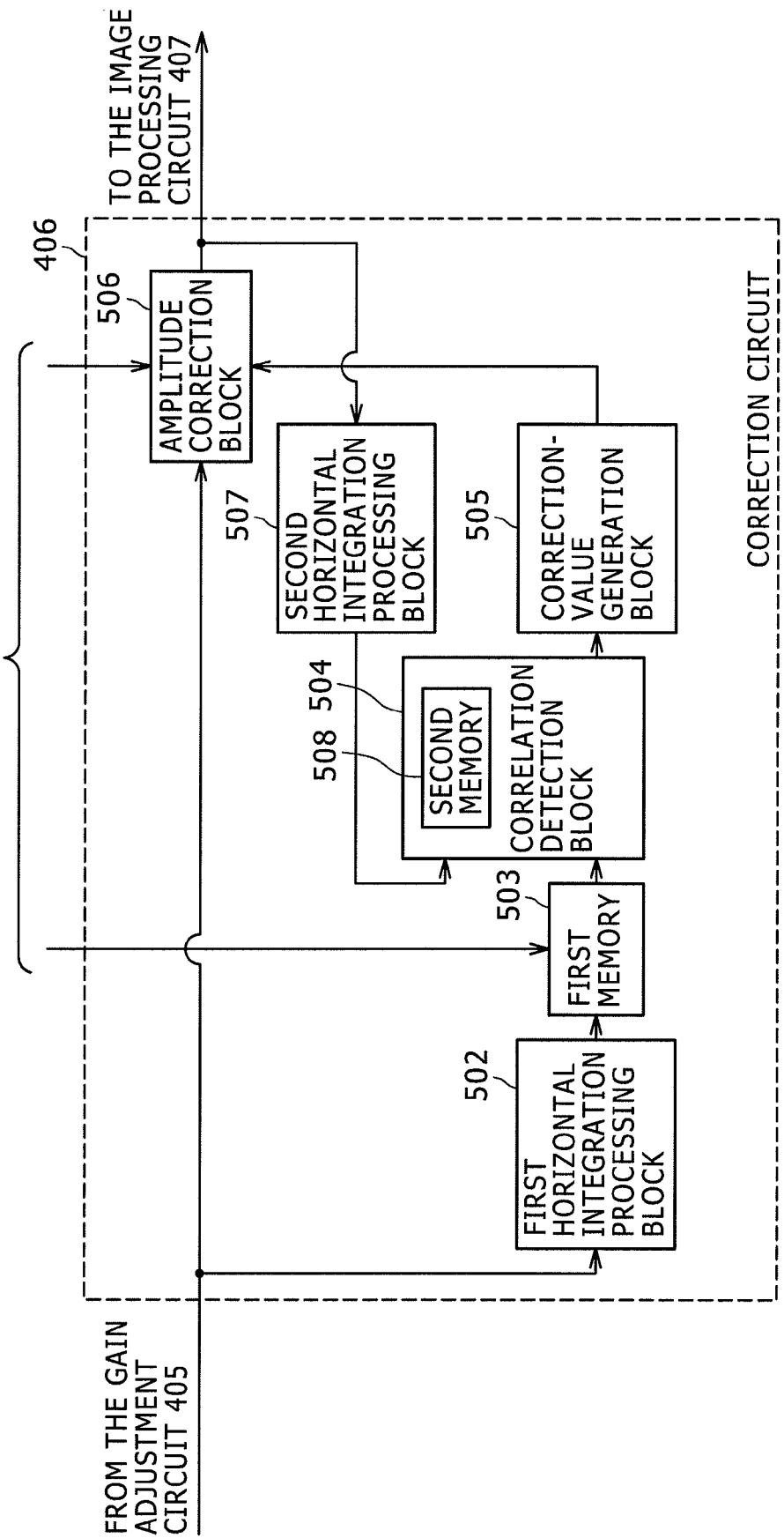
FIG. 16 is a block diagram showing a correction circuit employed in the image taking apparatus according to the other embodiment of the present invention.

FIG. 16 is a block diagram showing a correction circuit 406 employed in the image taking apparatus 1501.

The image taking apparatus 1501 generates a reference value and carries out a flicker correction process by making use of the reference value for every frame alternately. These operations are repeated till the user enters a recording start command to record a video into the recording section 409 to the image taking apparatus 1501. That is to say, a microcomputer 1502 employed in the image taking apparatus 1501 according to the other embodiment supplies a reference-value using command described earlier to the image taking device 404 with a timing skipping a frame by making use of a vertical synchronization signal till a recording start command to record a video into the recording section 409 is received from the user through the operation section 403. It is to be noted that other functions of the microcomputer 1502 are identical with those of the microcomputer 402 employed in the image taking apparatus 401 according to the embodiment described before by referring to the block diagram of FIG. 4.

The configuration of the image taking apparatus 1501 shown in the block diagram of FIG. 15 is identical with the configuration of the image taking apparatus 401 shown in the block diagram of FIG. 4. The configuration of the correction circuit 406 shown in the block diagram of FIG. 16 is identical with the configuration of the image taking apparatus 401 shown in the block diagram of FIG. 5. Thus, the operations carried out by the image taking apparatus 1501 as a whole are not explained in order to avoid duplications of descriptions.

Operations of the Image Taking Apparatus According to the Other Embodiment

Figure 17:
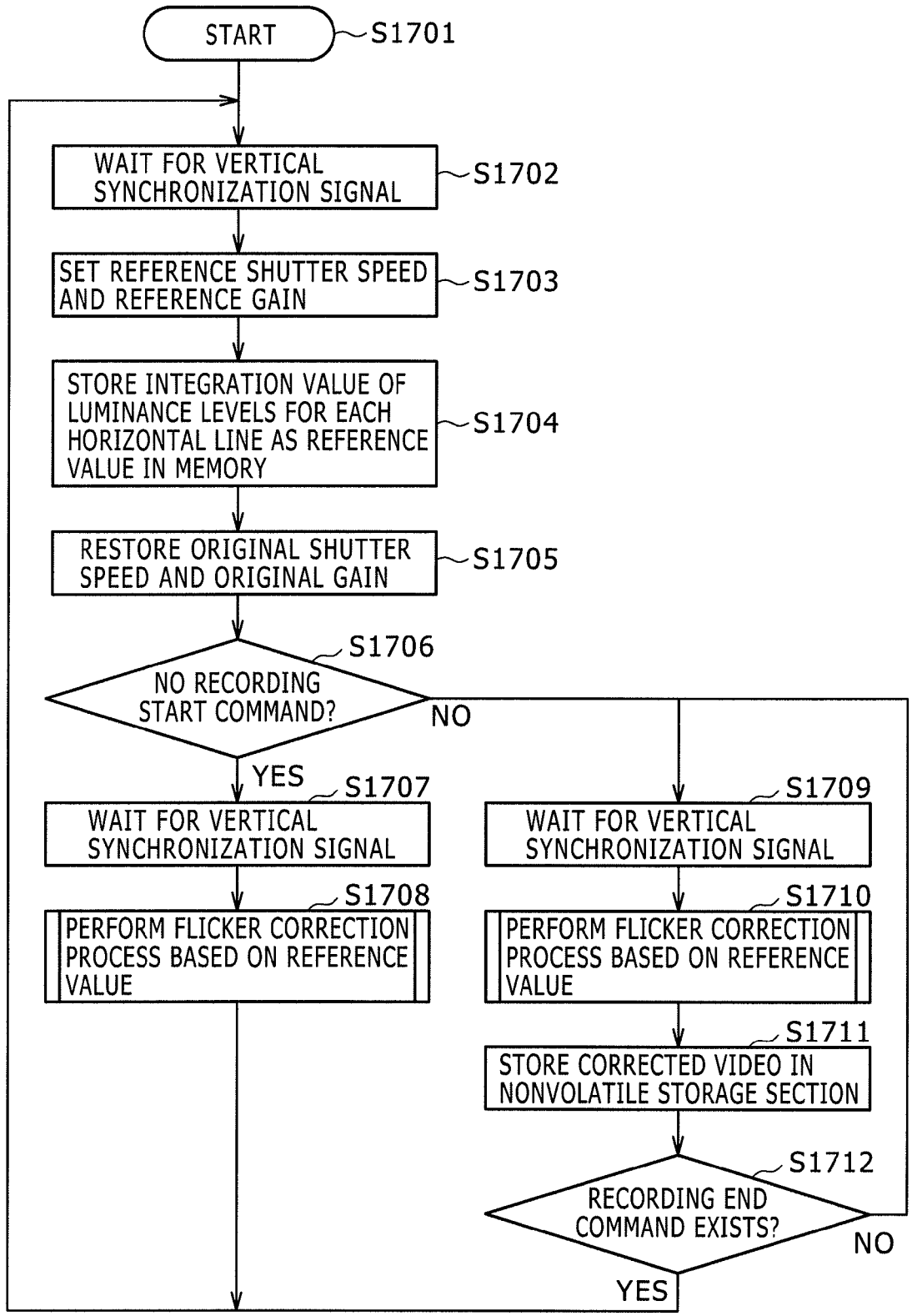
FIG. 17 shows a flowchart representing the sequence of operations carried out by the image taking apparatus according to the other embodiment of the present invention.

By referring to a flowchart shown in FIG. 17, the following description explains the flow of processing carried out by each functional block which composes the image taking apparatus 1501.

FIG. 17 shows a flowchart representing the sequence of operations carried out by the image taking apparatus 1501.

At the step S1701, an image taking shutter speed and an image taking gain are set when the user turns on the power supply of the image taking apparatus 1501. To put it more concretely, on the basis of the operation carried out by the user on the operation section 403, the microcomputer 1502 sets an image taking shutter speed and an image taking gain, which have been explained earlier, in the image taking device 404 and the gain adjustment circuit 405.

Then, at the next step S1702, the microcomputer 1502 enters a state of waiting for a vertical synchronization signal supplied from a synchronization signal generating section not shown. As the microcomputer 1502 receives the vertical synchronization signal, the microcomputer 1502 interprets the vertical synchronization signal as a reference-value using command which has also been described before as well. Subsequently, at the next step S1703, the microcomputer 1502 sets a reference shutter speed and a reference gain in the image taking device 404 and the gain adjustment circuit 405 respectively.

Then, at the next step S1704, a reference video signal obtained as a result of processes carried out by the image taking device 404 at the reference shutter speed and a gain adjustment process carried out by the gain adjustment circuit 405 at the reference gain is supplied to the first horizontal integration processing block 502 employed in the correction circuit 406. Subsequently, the integration value of luminance levels is computed for each horizontal line of an image represented by the reference video signal and stored in the first memory 503 as a reference value.

Then, at the next step S1705, in accordance with control executed by the microcomputer 1502, the reference shutter speed set in the image taking device 404 is changed back to the image taking shutter speed whereas the reference gain set in the gain adjustment circuit 405 is changed back to the image taking gain.

Subsequently, at the next step S1706, the microcomputer 1502 makes a determination as to whether or not the video obtained as a result of the image taking operation is recorded into the recording section 409. That is to say, the microcomputer 1502 makes a determination as to whether or not the user has entered the recording start command to a command section not shown. If the outcome of the determination process carried out at the step S1706 is YES indicating that the user has not entered the recording start command, the flow of the processing goes on to a step S1707 at which the microcomputer 1502 enters a state of waiting for a vertical synchronization signal supplied from the synchronization signal generating section not shown in the figure.

As the vertical synchronization signal is supplied to the microcomputer 1502, the flow of the processing goes on to a step S1708. At the step S1708, in accordance with control executed by the microcomputer 1502, the image taking video signal described above is supplied to the amplitude correction block 506 employed in the correction circuit 406. Then, the amplitude correction block 506 carries out an amplitude correction process as a part of a flicker correction process based on reference values stored in the first memory 503 on the image taking video signal.

As the execution of the flicker correction process carried out at the step S1708 is completed, the flow of the processing goes back to the step S1702 in order to repeat the process of the step S1702 and the processes of the subsequent steps following the step S1702.

If the outcome of the determination process carried out at the step S1706 is NO indicating that the user has entered a recording start command to the microcomputer 1502, on the other hand, the flow of the processing goes on to a step S1709 at which the microcomputer 1502 waits for a vertical synchronization signal supplied from a vertical synchronization signal generating section not shown in the figure. As the vertical synchronization signal is supplied to the microcomputer 1502, the flow of the processing goes on to a step S1710. At the step S1710, in accordance with control executed by the microcomputer 1502, the image taking video signal described above is supplied from the gain adjustment circuit 405 to the amplitude correction block 506 employed in the correction circuit 406. Then, the amplitude correction block 506 carries out an amplitude correction process as a part of a flicker correction process based on reference values stored in the first memory 503 on the image taking video signal. Subsequently, at the next step S1711, the amplitude correction block 506 supplies an image taking video signal obtained as a result of the flicker correction process to the display section 408 and the recording section 409 by way of the image processing circuit 407. The display section 408 displays an image based on the image taking video signal whereas the recording section 409 is used for storing the video signal.

After the execution of the processes carried out at the step S1711 has been completed, the flow of the processing goes on to a step S1712 at which the microcomputer 1502 makes a determination as to whether or not the recording process to record the image taking video signal into the recording section 409 is continued, that is, whether or not the user has entered a recording end command to a command section not shown. If the outcome of the determination process carried out at the step S1712 is NO indicating that the user has not entered a recording end command, the flow of the processing goes back to the step S1709 in order to repeat the process of the step S1709 and the processes of the subsequent steps following the step S1709. If the outcome of the determination process carried out at the step S1712 is YES indicating that the user has entered a recording end command, the flow of the processing goes back to the step S1702 in order to repeat the process of the step S1702 and the processes of the subsequent steps following the step S1702. It is to be noted that the flicker correction processes carried out at the steps S1708 and S1710 are identical with the flicker correction process carried out at the step S607 of the flowchart shown in FIG. 6. Details of the flicker correction process carried out at the step S607 of the flowchart shown in FIG. 6 have been explained previously by referring to the flowchart shown in FIGS. 7 and 8.

As described above, in the case of this other embodiment, it is possible to easily detect the phase of flickers having a standstill phase for every frame and correct the flickers as is the case with the embodiment explained previously.

In addition, in the case of this other embodiment, in accordance with a vertical synchronization signal, the image taking apparatus 1501 generates a reference value and carries out a flicker correction process making use of the reference value for every frame alternately. The flicker correction process carried out for every frame is continued till an operation to record a video represented by an image taking video signal into the recording section 409 is started. Thus, the phase and amplitude of the correction waveform are sustained at proper values giving a proper shape of the waveform till a point of time immediately leading ahead of the start of the operation to record a video represented by an image taking video signal into the recording section 409. By making use of a correction waveform computed right after the start of the operation to record a video represented by an image taking video signal into the recording section 409, a flicker correction process can be carried out on an image taking video signal to be recorded into the recording section 409. By carrying out the flicker correction process in such a way, flickers can be eliminated with a high degree of reliability from the image represented by the image taking video signal.

In each of the embodiments described above, a flicker correction process is carried out to eliminate flickers which are generated in an image taking operation carried out by the image taking apparatus 401 having a frame rate of 60 frames/second and employing an electronic shutter with a shutter speed at ¹⁄₂₀₀₀ seconds through the use of a light source which is blinking due to a power-supply frequency of 60 Hz. As explained before, the light source blinking at a power-supply frequency of 60 Hz is referred to as a 60-Hz fluorescent lamp. It is to be noted, however, that the flicker correction process can also be carried out to eliminate flickers which are generated in an image taking operation carried out by the image taking apparatus 401 having a frame rate of 50 frames/second and employing an electronic shutter with any shutter speed through the use of a light source which is blinking due to a power-supply frequency of 50 Hz. That is to say, it is possible to reliably eliminate flickers generated by an image taking operation in which the frame rate is equal to the blinking frequency of the fluorescent lamp serving as a light source.

Each of the embodiments described above generates a correction waveform, which is utilized for eliminating flickers, by making use of the luminance. It is to be noted, however, that also in the case of a flicker correction process carried out on a color signal such as a R (red), G (green) or B (blue) signal, the flicker correction process can be performed by finding a correction waveform through the use of the level of the color signal in the same way as the flicker correction process which is performed by generating a correction waveform through the use of the luminance. In the case of a flicker correction process carried out on a color signal, the light-emission and afterglow characteristics of the fluorescent lamp may vary from color to color. Even if the light-emission and afterglow characteristics of the fluorescent lamp vary from color to color, however, it is possible to eliminate standstill flickers from an image generated in an image taking operation.

In addition, in each of the embodiments described above, the change directions of the phase and amplitude of a correction waveform are determined for every frame. However, implementations of the present invention are by no means limited to the embodiments. For example, it is also possible to provide a typical configuration in which the change direction of the phase of a correction waveform is determined for every frame whereas the change direction of the amplitude of the correction waveform is determined for every five frames. In the case of a configuration wherein the change direction of the phase of a correction waveform is determined at intervals different from intervals at which the change direction of the amplitude of the correction waveform is determined, there is provided a difference in convergence between the phase and the amplitude so that the flicker correction process can be carried out with a higher degree of stability.

Embodiments of the present invention have been explained so far. However, implementations of the present invention are by no means limited to the embodiments. It is needless to say that the embodiments can be changed to a variety of arbitrarily modified versions for a variety of arbitrary applications as long as the versions and the applications are within a range which does not deviate from essentials of the present invention.

The present application contains subject matter related to that disclosed in Japanese Priority Patent Application JP 2008-217256 filed in the Japan Patent Office on Aug. 26, 2008, the entire content of which is hereby incorporated by reference.

What is claimed is:

1. An image taking apparatus comprising:
an image taking device;
a gain adjustment circuit; and
a correction circuit; wherein
said image taking device operates with timings based on a frame rate determined in advance and the total number of horizontal lines, has an electronic shutter allowing a shutter speed to be adjusted, receives light in a period equal to said shutter speed of said electronic shutter and carries out an opto-electrical conversion process on said light for every horizontal line in order to generate a predetermined signal;
said gain adjustment circuit adjusts the gain of said electrical signal received from said image taking device in order to generate a video signal which is a signal having a level determined in advance;
said correction circuit compares an image taking video signal generated by said gain adjustment circuit with a reference video signal also generated by said gain adjustment circuit in order to compute a flicker component contained in said image taking video signal as a component oriented in the vertical direction of an image represented by said image taking video signal in a flicker correction process of eliminating flickers contained in said image represented by said image taking video signal in accordance with said computed flicker component; and
said image taking video signal is a video signal which is generated by said gain adjustment circuit when the blinking period of said received light is equal to the integral multiple of a frame rate and a shutter speed determined in advance has been set for said electronic shutter whereas said reference video signal is a flicker-free video signal which is generated without a flicker by said gain adjustment circuit when said blinking period of said received light is equal to the integral multiple of a frame rate and a reference shutter speed expressed in terms of an exposure time equal to a multiple of said blinking period of said received light has been set for said electronic shutter.

2. The image taking apparatus according to claim 1, comprising:
a control section configured to compute a reference shutter speed for generating said reference video signal and a reference gain for said reference shutter speed on the basis of said blinking period of said received light, a shutter speed specified in advance by the user and a gain specified in advance by said user to serve as a gain for said specified shutter speed, respectively set said reference shutter speed in said electronic shutter and said reference gain in said gain adjustment circuit, and respectively set said reference shutter speed set in said electronic shutter to said shutter speed specified in advance by said user and said reference gain set in said gain adjustment circuit to said gain for said specified shutter speed after said process of generating said reference video signal has been completed.

3. The image taking apparatus according to claim 2, wherein said correction circuit eliminates flickers from an image represented by said image taking video signal by computing a correction waveform having a phase at least opposite to the phase of said computed flicker component contained in said image taking video signal as a component oriented in the vertical direction of said image represented by said image taking video signal, and superposing said correction waveform on every horizontal line of said image represented by said image taking video signal.

4. The image taking apparatus according to claim 3, wherein said correction circuit includes:
a horizontal integration processing section configured to integrate said reference video signal in the direction of said horizontal lines of an image represented by said reference video signal in order to find a signal-level sum of said reference video signal for each specific one of said horizontal lines to be used as a reference value of said specific horizontal line and to integrate said image taking video signal in the direction of said horizontal lines of an image represented by said image taking video signal in order to find a signal-level sum of said image taking video signal for each particular one of said horizontal lines to be used as an image-taking value of said particular horizontal line;
a first memory configured to store said reference values each computed for one of said horizontal lines of an image represented by said reference video signal;
a correlation detection section configured to read out said reference values from said first memory and find a correlation value representing a difference between each specific one of said reference values and a particular one of said image taking values computed by said horizontal integration processing section as a particular image taking value for the same horizontal line as said specific reference value;
a correction-value generation section configured to correct or generate said correction waveform on the basis of a detection result produced by said correlation detection section; and
an amplitude correction section configured to superpose said correction waveform generated by said correction-value generation section on every horizontal line of said image represented by said image taking video signal in order to eliminate said flickers from said image represented by said image taking video signal.

5. The image taking apparatus according to claim 4, wherein:
said correction circuit further has a second memory configured to store a sum of said correlation values found by said correlation detection section as a correlation-value sum for a frame composed of a plurality of said horizontal lines;
said correlation detection section compares said correlation-value sum computed currently for a current frame with said correlation-value sum computed previously for a previous frame and already stored in said second memory; and
said correction-value generation section generates said correction waveform on the basis of a comparison result produced by said correlation detection section.

6. The image taking apparatus according to claim 5, wherein:
said correlation detection section compares said correlation-value sum computed currently for a current frame with said correlation-value sum computed previously for a previous frame and already stored in said second memory in order to make a determination as to whether or not said correlation-value sum computed currently for a current frame is greater than said correlation-value sum computed previously for a previous frame and already stored in said second memory; and
said correction-value generation section generates new correction waveform on the basis of a result of a determination made by said correlation detection section as said determination as to whether or not said correlation-value sum computed currently for a current frame is greater than said correlation-value sum computed previously for a previous frame and already stored in said second memory.

7. The image taking apparatus according to claim 6, wherein:
said correlation detection section compares said correlation-value sum computed currently for a current frame with said correlation-value sum computed previously for a previous frame and already stored in said second memory in order to determine whether or not said correlation-value sum computed currently for a current frame is greater than said correlation-value sum computed previously for a previous frame and already stored in said second memory; and
if said correlation-value sum computed currently for a current frame is found greater than said correlation-value sum computed previously for a previous frame and already stored in said second memory, said correction-value generation section generates a new correction waveform by inverting change directions of the phase and amplitude of said correction waveform generated previously and changing each of said phase and said amplitude by a quantity determined in advance.

8. The image taking apparatus according to claim 7, wherein:
said correlation detection section compares said correlation-value sum computed currently for a current frame with said correlation-value sum computed previously for a previous frame and already stored in said second memory in order to determine whether or not said correlation-value sum computed currently for a current frame is greater than said correlation-value sum computed previously for a previous frame and already stored in said second memory; and
if said correlation-value sum computed currently for a current frame is found smaller than said correlation-value sum computed previously for a previous frame and already stored in said second memory, said correction-value generation section generates a new correction waveform by sustaining change directions of the phase and amplitude of said correction waveform generated previously as they are and changing each of said phase and said amplitude by a quantity determined in advance.

9. The image taking apparatus according to claim 5, further comprising:
an operation section;
wherein, when said control section detects a command entered by said user to said operation section to serve as a command to use said reference video signal, said control section sets said reference shutter speed on the basis of said blinking period of said received light in said electronic shutter, computes a predefined gain on the basis of said reference shutter speed set in said electronic shutter, said shutter speed specified in advance by said user and said gain also specified in advance by said user, and sets said computed gain in said gain adjustment circuit.

10. The image taking apparatus according to claim 5, wherein said control section controls said image taking device and said gain adjustment circuit and generates a reference video signal at intervals determined in advance.

11. A correction circuit comprising:
a horizontal integration processing section configured to integrate a reference video signal in the direction of horizontal lines of an image represented by said reference video signal in order to find a signal-level sum of said reference video signal for each specific one of said horizontal lines to be used as a reference value of said specific horizontal line and to integrate an image taking video signal in the direction of said horizontal lines of an image represented by said image taking video signal in order to find a signal-level sum of said image taking video signal for each particular one of said horizontal lines to be used as an image-taking value of said particular horizontal line;
a memory configured to store said reference values each computed for one of said horizontal lines of an image represented by said reference video signal;
a correlation detection section configured to read out said reference values from said memory and finding a correlation value representing a difference between each specific one of said reference values and a particular one of said image taking values computed by said horizontal integration processing section as a particular image taking value for the same horizontal line as said specific reference value in order to compute a flicker component;
a correction-value generation section configured to generate a correction waveform having a phase at least opposite to the phase of said flicker component computed by said correlation detection section; and
an amplitude correction section configured to superpose said correction waveform generated by said correction-value generation section on every horizontal line of said image represented by said image taking video signal in order to eliminate said flickers from said image represented by said image taking video signal; wherein
said reference video signal is a flicker-free video signal which is generated by an image taking device to serve as a video signal representing an image containing no flicker oriented in the vertical direction of said image taking device when a shutter speed equal to a multiple of the blinking period of light received by said image taking device has been set for an electronic shutter employed in said image taking device; and
said image taking video signal is a video signal which is generated by said image taking device when a shutter speed determined in advance has been set for said electronic shutter.

12. A correction method comprising:
a shutter-speed setting step of setting the shutter speed of an electronic shutter employed in an image taking device, which operates with timings based on a frame rate determined in advance and the total number of horizontal lines, to serve as an electronic shutter allowing said shutter speed to be adjusted;
a signal generation step of generating a signal with the type determined in advance by carrying out an opto-electrical conversion process for each of said horizontal lines on received light during a period equal to the shutter speed set in said electronic shutter at said shutter-speed setting step;
a video-signal generation step of generating a video signal from said signal generated at said signal generation step by adjusting the gain of said signal in order to provide said video signal with a level determined in advance; and
a flicker elimination step of comparing an image taking video signal with a reference video signal in order to compute a flicker component contained in said image taking video signal as a component oriented in the vertical direction of an image represented by said image taking video signal in a flicker correction process of eliminating flickers contained in said image represented by said image taking video signal in accordance with said computed flicker component; wherein
said image taking video signal is a video signal which is generated at said video-signal generation step when the blinking period of said received light is equal to the integral multiple of a frame rate and a shutter speed determined in advance has been set for said electronic shutter; and
said reference video signal is a flicker-free video signal which is generated at said video-signal generation step when said blinking period of said received light is equal to the integral multiple of a frame rate and a reference shutter speed equal to integral multiple of said blinking period of said received light has been set for said electronic shutter.

* * * * *